(12) United States Patent
Zhou

(10) Patent No.: US 12,089,062 B2
(45) Date of Patent: Sep. 10, 2024

(54) INFORMATION TRANSMISSION METHOD USER EQUIPMENT AND BASE STATION

(71) Applicant: BEIJING XIAOMI MOBILE SOFTWARE CO., LTD., Beijing (CN)

(72) Inventor: Juejia Zhou, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 415 days.

(21) Appl. No.: 17/439,930

(22) PCT Filed: Mar. 19, 2019

(86) PCT No.: PCT/CN2019/078622
§ 371 (c)(1),
(2) Date: Sep. 16, 2021

(87) PCT Pub. No.: WO2020/186441
PCT Pub. Date: Sep. 24, 2020

(65) Prior Publication Data
US 2022/0191709 A1    Jun. 16, 2022

(51) Int. Cl.
*H04W 16/28* (2009.01)
*H04L 1/00* (2006.01)

(52) U.S. Cl.
CPC ........... *H04W 16/28* (2013.01); *H04L 1/0025* (2013.01)

(58) Field of Classification Search
CPC .... H04W 16/28; H04L 1/0025; H04L 5/0053; H04L 5/0096; H04L 5/0025;
(Continued)

(56) References Cited

U.S. PATENT DOCUMENTS

2005/0265321 A1*  12/2005 Rappaport ............ H04W 16/20
                                                              370/352
2018/0191422 A1     7/2018 Xia et al.
(Continued)

FOREIGN PATENT DOCUMENTS

CN        106877913 A    6/2017
CN        107872253 A    3/2018
(Continued)

OTHER PUBLICATIONS

Indian Patent Application No. 202147046947, Office Action dated Apr. 27, 2022, 6 pages.
(Continued)

*Primary Examiner* — Sudesh M Patidar
(74) *Attorney, Agent, or Firm* — Cozen O'Connor

(57) ABSTRACT

A device and method may obtain beam offset configuration information for instructing an information transmission end to adjust an initial matching beam pair in a first preset operating mode when there is a preset operating mode change, so as to determine a target matching beam pair in a second preset operating mode, wherein the preset operating mode change indicates that the information transmission end is switched from the first preset operating mode to the second preset operating mode. The device and method may adjust the initial matching beam pair according to the beam offset configuration information, in response to detecting that the information transmission end or a local end communicating with the information transmission end is switched from the first preset operating mode to the second preset operating mode, so as to obtain the target matching beam pair and transmit information according to the target matching beam pair.

15 Claims, 16 Drawing Sheets

(58) Field of Classification Search
CPC .... H04B 7/0695; H04B 7/088; H04B 17/382; H04B 17/3913
See application file for complete search history.

(56) References Cited

U.S. PATENT DOCUMENTS

| | | | | |
|---|---|---|---|---|
| 2018/0288757 A1* | 10/2018 | Sun | ................... | H04B 7/088 |
| 2018/0324657 A1* | 11/2018 | Li | ................... | H04B 7/0413 |
| 2019/0037426 A1* | 1/2019 | Yu | ................... | H04W 72/23 |
| 2019/0141617 A1* | 5/2019 | Abedini | ............ | H04L 5/0053 |
| 2019/0150013 A1* | 5/2019 | Zhang | ................ | H04B 7/082 |
| | | | | 375/224 |
| 2019/0159048 A1* | 5/2019 | Feldkamp | ............ | H04L 43/08 |
| 2019/0319686 A1* | 10/2019 | Chen, IV | ............ | H04W 24/08 |
| 2019/0327629 A1* | 10/2019 | Zhang | ............... | H04B 7/0658 |
| 2020/0221319 A1* | 7/2020 | Kang | ................ | H04W 16/28 |
| 2021/0152447 A1* | 5/2021 | Yang | ................ | H04W 16/28 |

FOREIGN PATENT DOCUMENTS

| | | | | | |
|---|---|---|---|---|---|
| CN | 110611931 B | * | 4/2021 | ........... | H04B 17/309 |
| CN | 107872253 B | | 6/2021 | | |
| EP | 3373466 A1 | | 9/2018 | | |
| WO | WO-2018202017 A1 | * | 11/2018 | | |

OTHER PUBLICATIONS

European Patent Application No. 19920460.3, Search and Opinion dated Sep. 23, 2022, 12 pages.
PCT/CN2019/078622 English translation of the International Search Report dated Dec. 18, 2019, 2 pages.

\* cited by examiner

INFORMATION TRANSMISSION METHOD USER EQUIPMENT AND BASE STATION

CROSS-REFERENCE TO RELATED APPLICATION

This application is the U.S. national phase application of International Application No. PCT/CN2019/078622, filed on Mar. 19, 2019, the entire contents of which are incorporated herein by reference for all purposes.

TECHNICAL FIELD

The disclosure relates to the field of communication technology, and in particular to a method for transmitting information, an apparatus for transmitting information, a user equipment and a base station.

BACKGROUND

5G NR (New Radio) develops a lot of new frequencies for transmission. The use of high-frequency spectrum is a feature of 5G NR, where the application of millimeter wave (mmwave) with a frequency above 6 GHz is the most typical solution.

In the mmwave application of the 5G NR system, the beamforming technology is adopted to transmit information between the base station and the UE (User Equipment). Typically, in the communication process, a transmitting end, such as a base station gNB, adopts a large-scale antenna array to send high-frequency beams with a frequency above 6 GHz in the direction of a receiving end. After the receiving end uses a mmwave antenna module to receive the above beams, a communication connection with the transmission end is established to send and receive information through the above high-frequency beams.

In order to use the beamforming technology, the base station and the UE may detect in a beam sweeping manner that, which beam is used for transmission to meet both requirements on the maximum equivalent isotropic radiated power (EIRP) in a certain direction and requirements on receiving spherical coverage.

In the 5G mmwave, the currently determined frequency bands are all TDD (Time Division Duplexing) frequency bands. The TDD frequency bands have an uplink and downlink reciprocity, that is, both uplink and downlink are performed in the same frequency band, and the channel conditions are similar, which means that the optimal beam for the downlink may also be the optimal beam for the uplink. Therefore, the 5G mmwave recommends the UE to achieve a beam correspondence capability. That is, uplink transmission uses the same sequence of beams as the beams used by the UE for downlink reception, thereby preventing the UE from using the beam sweeping manner to determine the uplink beam and effectively shortening a control time of the beam.

SUMMARY

Embodiments of the disclosure in a first aspect provide a method for transmitting information. The method includes: obtaining beam offset configuration information for instructing an information transmission end to adjust an initial matching beam pair in a first preset operating mode when there is a preset operating mode change, so as to determine a target matching beam pair in a second preset operating mode, in which the preset operating mode change indicates that the information transmission end is switched from the first preset operating mode to the second preset operating mode; adjusting the initial matching beam pair according to the beam offset configuration information in response to detecting that the information transmission end or a local end communicating with the information transmission end is switched from the first preset operating mode to the second preset operating mode, so as to obtain the target matching beam pair; and transmitting information in the second preset operating mode according to the target matching beam pair.

Embodiments of the disclosure in a second aspect provide a user equipment. The user equipment includes: a processor and a memory for storing instructions executable by the processor. The processor is configured to: obtain beam offset configuration information for instructing an information transmission end to adjust an initial matching beam pair in a first preset operating mode when there is a preset operating mode change, so as to determine a target matching beam pair in a second preset operating mode, in which the preset operating mode change indicates that the information transmission end is switched from the first preset operating mode to the second preset operating mode; adjust the initial matching beam pair according to the beam offset configuration information in response to detecting that the UE is switched from the first preset operating mode to the second preset operating mode, so as to obtain the target matching beam pair; and transmit information in the second preset operating mode according to the target matching beam pair.

Embodiments of the disclosure in a third aspect provide a base station. The base station includes: a processor and a memory for storing instructions executable by the processor. The processor is configured to: obtain beam offset configuration information for instructing an information transmission end to adjust an initial matching beam pair in a first preset operating mode when there is a preset operating mode change, so as to determine an optimal matching beam pair in a second preset operating mode, in which the preset operating mode change indicates that the information transmission end is switched from the first preset operating mode to the second preset operating mode; adjust the initial matching beam pair according to the beam offset configuration information in response to detecting that the base station is switched from the first preset operating mode to the second preset operating mode, so as to obtain the target matching beam pair; and transmit information in the second preset operating mode according to the target matching beam pair.

It should be understood that the above general description and the following detailed description are only explanatory, which cannot limit the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

FIG. 2 is a flowchart illustrating a method for transmitting information according to an embodiment of the disclosure.

DETAILED DESCRIPTION

Figure 1:
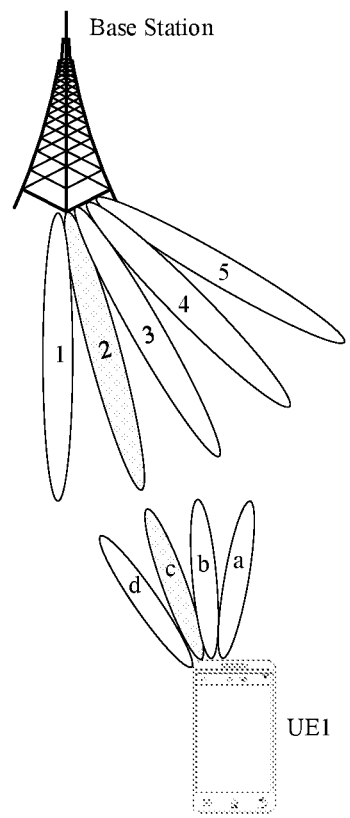
FIGS. 1-1 and 1-2 are schematic diagrams illustrating an application scenario for transmitting information according to an embodiment of the disclosure.

The embodiments herein will be described in detail, examples of which are illustrated in the accompanying drawings. The following description refers to the accompanying drawings in which the same numbers in different drawings represent the same or similar elements unless otherwise stated. The implementations set forth in the following description of embodiments do not represent all implementations consistent with the disclosure. Instead, they are merely examples of apparatuses and methods consistent with aspects related to the disclosure as recited in the appended claims.

The terms used in the disclosure are only for the purpose of describing specific embodiments, and are not intended to limit the disclosure. The singular forms of "a", "said" and "the" used in the disclosure and appended claims are also intended to include plural forms, unless the context clearly indicates other meanings. It should be understood that the term "and/or" as used herein refers to and includes any or all possible combinations of one or more associated items listed.

It should be understood that although the terms "first", "second" and "third" are used in the disclosure to describe various information, the information should not be limited to these terms. These terms are only used to distinguish the same type of information from each other. For example, without departing from the scope of the disclosure, the first information may also be referred to as second information, and similarly, the second information may also be referred to as first information. Depending on the context, the word "if" as used herein is interpreted as "when" or "upon" or "in response to determining".

The executive objects involved in the disclosure include: base stations and UEs in mobile communication networks such as a 4G LTE (Long Term Evolution), a LTE-NR interworking, a 5G NR, and a 6G. The base station may be a base station or a sub-base station provided with a large-scale antenna array. The UE may be a user terminal, a user node, a mobile terminal or a tablet computer, etc. In the specific implementation, the base station and the UE are independent of each other, and at the same time, connected to each other to jointly implement the technical solution of the disclosure.

In the application scenario of the disclosure, when the UE and the base station use high-frequency beams to transmit information in the first preset operating mode, information on the optimal matching beam pair in the first preset operating mode has been determined according to the BC (beam correspondence) technology. The information on the optimal matching beam pair indicates that when a preset sequence of uplink beams transmitted by the UE in the first preset operating mode cooperate with a preset sequence of downlink beams transmitted by the base station to carry the information for transmission between the base station and the UE, the optimal transmission performance may be obtained. In the disclosure, the optimal matching beam pair determined in the first preset operating mode may be referred to as an initial matching beam pair. The uplink beam refers to the high-frequency beam transmitted by the UE to the base station, and the downlink beam refers to the beam transmitted by the base station to the UE.

However, if a relative location between the base station and the UE antenna module changes at different times due to factors such as a high-speed movement of the UE, the beam pair determined by the above beam correspondence method may not achieve the optimal transmission effect, thereby affecting the transmission performance.

At certain moment, it is necessary that the UE and the base station are switched to the second preset operating mode. In the second preset operating mode, if the UE still determines the target matching beam pair by using the method of determining the optimal matching beam pair in the first preset operating mode, and the desired transmission performance cannot be obtained.

Figures 1, 2:
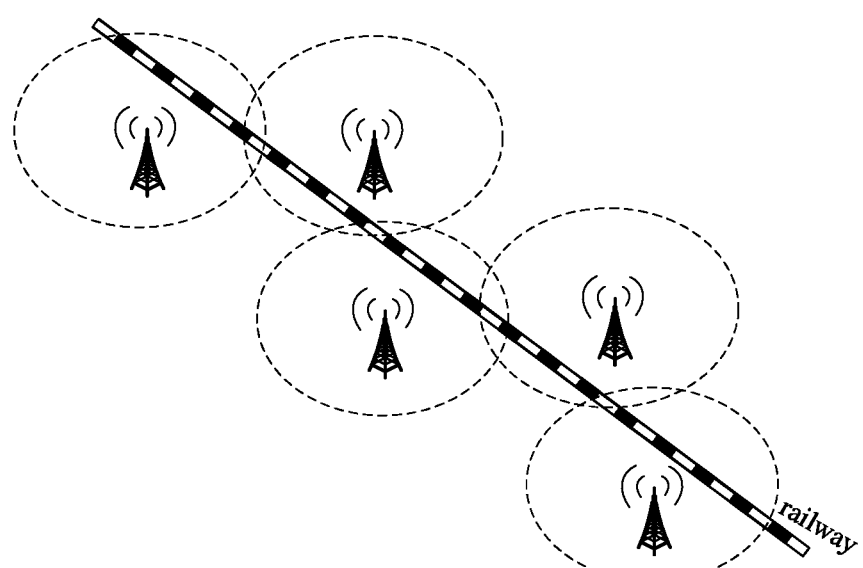
Figure 2:
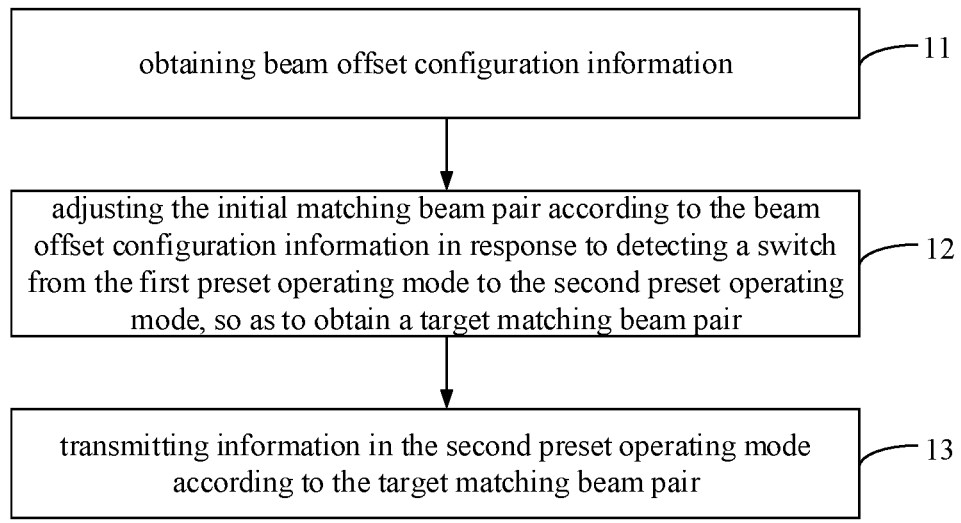

FIG. 1-1 and FIG. 1-2 are schematic diagrams illustrating a scenario for transmitting information according to an embodiment. It is assumed that UE1 accurately determines the optimal matching beam pair required in the first preset operating mode by performing beam scanning with a preset beam scanning period in the first preset operating mode, for example, performing beam scanning every 5 ms. As illustrated in FIG. 1-1, the optimal matching beam pair may be expressed as (beam 2, beam c), in which the beam 2 represents the beam sequence transmitted by the base station, and the beam c represents the beam sequence transmitted by the UE.

In an application scenario, the above first preset operating mode may correspond to a preset operating mode where a preset type of UE, such as a M-type UE1, moves at a low speed relative to dedicated base stations along a preset high-speed railway as illustrated in FIG. 1-2 as a reference, which may be referred to as a low-speed movement mode in the disclosure. The low-speed movement may be that the speed does not exceed a preset threshold, such as 80 km/h, or it may include the situation where the UE is stationary relative to the base station along the preset railway.

However, when the UE1 enters the second preset operating mode, such as a high-speed movement mode, if the UE1 still performs beam scanning in the first preset operating mode (such as performing beam scanning every 5 ms) to determine the information on the matching beam pair, this information may not keep up with the moving speed of UE1 relative to the base station since the moving speed of UE1 relative to the base station has changed greatly, for example, the moving speed is increased to 365 km/h (as the speed has increased a lot), resulting in a decrease in the transmission performance between the UE1 and the base station.

When the UE type and the base station information remain unchanged, after the UE and the base station are switched from the first preset operating mode to the second preset operating mode, the newly determined information on the optimal matching beam pair changes regularly relative to the initial matching beam information. For example, for a base station at a fixed location, such as a preset base station A located along a certain high-speed railway, when the moving speed of the preset type of UE relative to base station A changes from V1 to V2, a certain beam shifting strategy is adopted, for example, a preset number of beams are shifted in a preset direction and the initial matching beam pair is adjusted, to obtain information on the optimal matching beam pair in the second preset operating mode, that is, target matching beam pair information in a state of V2. The same type of UE may be understood as configuration information of the antenna module in the type of UE being identical. The configuration information of the antenna module may include information such as an installation location of the antenna module and transmission power configuration.

Based on the above observations, the disclosure provides a method for transmitting information. When a preset type of UE is about to or is switched from the first preset operating mode to the second preset operating mode, the optimal matching beam pair suitable for the second preset operating mode is determined by adjusting the initial matching beam pair based on the predetermined beam offset configuration information suitable for the operating mode change, thereby ensuring the information transmission performance of the UE and the base station in the second preset operating mode.

On the basis, the disclosure provides a method for transmitting information. FIG. 2 is a flowchart illustrating a method for transmitting information according to an embodiment, the method may include the following actions.

In step 11, beam offset configuration information is obtained.

The beam offset configuration information is used to instruct the information transmission end to adjust the initial matching beam pair in the first preset operating mode when a preset operating mode changes, so as to determine a target matching beam pair in the second preset operating mode. The above target matching beam pair refers to an optimal matching beam pair in the second preset operating mode. The information transmission end refers to the UE and the base station participating in the information transmission.

In the disclosure, the above preset operating mode change indicates that the information transmission end is switched from the first preset operating mode to the second preset operating mode. The factors that trigger the above preset operating mode change may include factors such as speed change information and location change information of the UE relative to the base station.

Generally, a beam pair change rate in the second preset operating mode is greater than a beam pair change rate in the first preset operating mode. The beam pair change rate refers to a number of times that the beam correspondence needs to be re-performed in a unit time.

The above initial matching beam pair refers to the optimal matching beam pair determined by the information transmission end performing beam scanning in a preset beam scanning period, such as 5 ms, in the first preset operating mode.

In the disclosure, the execution object of the method may be a preset type of UE, such as a M-type UE1, and may also be a base station set at a preset location, such as a base station located along the Beijing-Tianjin high-speed railway facilities, or a base station set in a preset geographic area of a certain city, which is not limited in the disclosure.

In the disclosure, the above beam offset configuration information includes: target beam offset information for indicating a beam offset direction and a beam offset amount.

In another embodiment of the disclosure, the above beam offset configuration information may further include: time information suitable for beam offset, which indicates a time range suitable for the target beam offset information.

Figure 3:
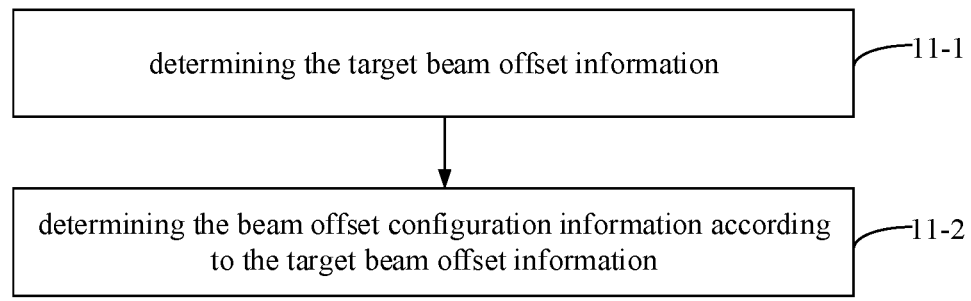
FIG. 3 is a flowchart illustrating another method for transmitting information according to an embodiment of the disclosure.

FIG. 3 is a flowchart illustrating another method for transmitting information according to an embodiment. The above step 11 may include the following actions.

In step 11-1, beam offset configuration information is obtained.

Regarding how the information transmission end determines the above target beam offset information, there are at least two manners in the embodiment of the disclosure.

In Manner 1, the above target beam offset information is determined by performing additional beam scanning.

In the disclosure, the additional beam scanning refers to a beam scanning triggered in addition to the normal periodic beam scanning, and the additional beam scanning is used to determine the target beam offset information applicable to the above preset operating mode change.

In the implementation process, the information transmission end first determines an optimal matching beam pair suitable for a current application scenario through the additional beam scanning. The above optimal matching beam pair is compared with the initial matching beam pair determined by performing the normal periodic beam scanning, and offset information of said optimal matching beam pair relative to said initial matching beam pair is determined, so as to obtain the target beam offset information.

In Manner 2, the target beam offset information is predicted by a preset model for beam offset prediction.

In the implementation process, the information transmission end, such as the UE, may obtain the preset model for beam offset prediction used to calculate the target beam offset information. Information of the preset operating mode change corresponding to the target application scenario is served as input information, such as change information (e.g., speed and location) of the UE relative to the base station, and the model may be configured to automatically calculate the target beam offset information. Compared with the first manner, the second manner may rapidly determine the target beam offset information without triggering the beam scanning, and may also save signaling overheads and resource occupation due to the additional beam scanning.

Taking the information transmission end UE as an example, the specific implementation process of the above two manners are respectively introduced below in detail.

In the specific implementation process of the first manner, when a preset trigger condition of the additional beam scanning may be detected by the information transmission end, the UE is triggered to perform additional beam scanning to determine the target beam offset information.

Figure 4:
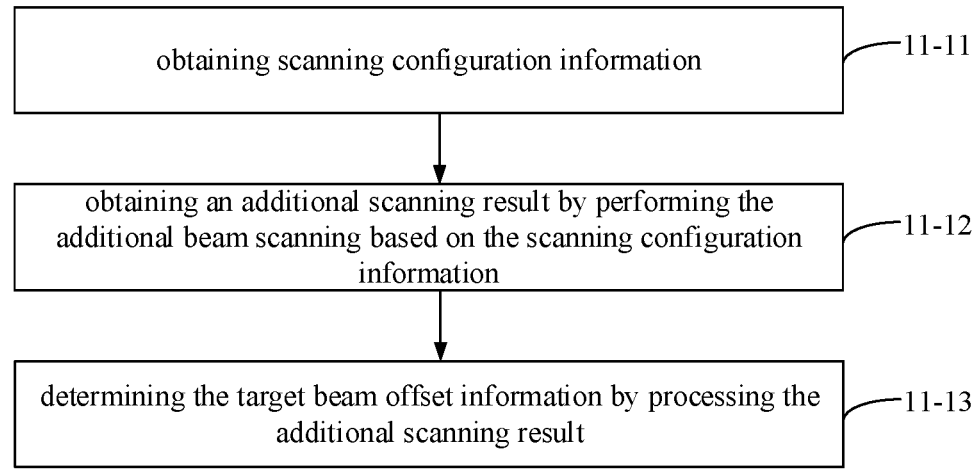
FIG. 4 is a flowchart illustrating another method for transmitting information according to an embodiment of the disclosure.

For the first manner of step 11-1, FIG. 4 is a flowchart illustrating another method for transmitting information according to an embodiment. Step 11-1 may include the following actions.

In step 11-11, scanning configuration information is obtained. The scanning configuration information is used to instruct the UE to perform the additional beam scanning according to preset time indication information. In some embodiments, the preset time indication information herein may include time information for triggering the additional beam scanning in a periodic or non-periodic manner.

Taking the target UE being the UE1 as an example, the UE1 obtains the scanning configuration information in at least two manners as follows.

In a system convention manner, the scanning configuration information is obtained according to system convention information preset in the UE1.

The above preset system convention information may include configuration information that is built into the local UE without receiving signaling from the base station, such as system protocol information solidified in a communication chip of the UE1 when factory settings are performed for the UE1, or preset scanning configuration information agreed by the system, which is obtained from information (such as system information) sent by the base station when the UE1 accesses the cell network covered by the base station. Afterwards, when the UE1 actively or passively triggers the additional beam scanning, the additional beam scanning is performed according to the preset beam scanning configuration information.

In a base station real-time transmission manner, the UE receives the additional scanning configuration information sent by the base station in real time, the implementation of which may include at least the following two cases.

In case 1, the UE receives the scanning configuration information sent by the base station under a first preset trigger condition.

In an embodiment of the disclosure, it may be agreed in the system that when the first preset trigger condition is detected by the base station, the UE is instructed to perform the additional beam scanning to re-determine the optimal matching beam pair.

The first preset trigger condition may be any of the following conditions.

In condition 1, when it is detected by the base station that the information transmission performance in the current operating mode is lower than a preset transmission performance threshold.

For example, when the base station determines that current channel quality indication (CQI) information of the target UE is lower than a preset CQI threshold, the scanning configuration information is sent to the target UE.

In the embodiments of the disclosure, the base station may determine the above CQI information according to at least one of the following information reported by the target UE, such as UE1, to the base station: RSRP (Reference Signal Received Power), RSRQ (Reference Signal Received Quality), RSSI (Received Signal Strengthen Indicator), and CQI level used to quantify the channel quality of a downlink reference signal.

In condition 2, the base station currently accessed by the UE has preset service requirements.

For example, when the UE moves from a first geographic area to a second geographic area, the second base station covering the second geographic area has a different communication standard protocol from the first base station covering the first geographic area. For example, the first base station implements a first communication standard protocol, and the second base station implements a second communication standard protocol. Since the second communication standard protocol adds new service requirements compared to the first communication standard protocol, the information transmission end is required to determine more accurate matching beam pair information, and the target UE accessing the second base station is required to perform additional beam scanning in the above preset beam scanning period.

On this basis, after it is detected that the target UE accesses the cell covered by the second base station, the additional scanning configuration information is actively sent by the second base station to the target UE for instructing the target UE to perform the additional beam scanning, so as to obtain a more accurate matching beam pair information.

In the above embodiment, the correspondence between the base station identifiers, the communication protocol types, and the geographic areas may be as shown in Table 1.

TABLE 1

| Base Station Identifier | Geographic Area | Communication Protocol Type |
| --- | --- | --- |
| First base station | First geographic area | First communication standard protocol |
| Second base station | Second geographic area | Second communication standard protocol |

In the case 2, when a second preset trigger condition is detected by the UE, the UE requests the base station to send the scanning configuration information.

Figure 5:
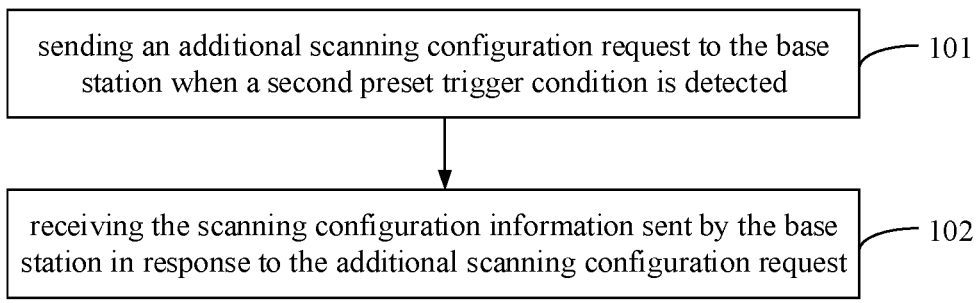
FIG. 5 is a flowchart illustrating another method for transmitting information according to an embodiment of the disclosure.

FIG. 5 is a flowchart illustrating another method for transmitting information according to an embodiment of the disclosure. The step 11-11 may include the following actions.

In step 101, an additional scanning configuration request is sent to the base station when a second preset trigger condition is detected.

The additional scanning configuration request is used to request the base station to send the scanning configuration information.

As still in the above example, in the embodiments of the disclosure, when the UE1 detects the second preset trigger condition by itself, the UE1 may actively request the base station to send the scanning configuration information, that is, send the additional scanning configuration request to the base station.

The second preset trigger condition may include any of the following conditions.

In the condition A, when the user equipment is configured to be in the second preset operating mode.

For example, if the UE1 detects the preset user trigger information, the user trigger information is configured to trigger the UE1 to enter the second preset operating mode. For example, the UE1 is manually set by the user to a high-speed movement mode, then the UE1 sends the above additional scanning configuration request to the base station.

In the condition B, when current preset parameter information indicates that the user equipment enters the second preset operating mode.

In an embodiment of the disclosure, the current preset parameter information (e.g., speed information) sensed by sensors built in the UE1, such as a speed sensor and an acceleration sensor, indicates that the UE1 currently enters the second preset operating mode, such as the high-speed movement mode, and the additional scanning configuration request may be actively sent to the base station.

In the disclosure, the UE1 may send the additional scanning configuration request to the base station through an upper layer signaling or a physical layer signaling. The upper layer signaling may be a RRC (Radio Resource Control) signaling, a MAC (Medium Access Control) signaling and a CE (Control Element) signaling.

In step 102, it is received the scanning configuration information sent by the base station responding to the additional scanning configuration request.

Correspondingly, after receiving the additional scanning configuration request, the base station may configure the scanning configuration information for the UE1 in real time and send the scanning configuration information to UE1, or send the predetermined scanning configuration information to the UE1.

In step 11-12, an additional scanning result is obtained by performing the additional beam scanning based on the scanning configuration information.

In the disclosure, the scanning configuration information is used to inform the UE how to perform the additional beam scanning, so as to further accurately determine the optimal matching beam pair in the second preset operating mode.

In the disclosure, the scanning configuration information may include: time information for triggering the additional scanning indicating when the UE starts the additional beam scanning.

In the case 1, the time information may be indication information for performing periodic additional scanning.

In an embodiment of the disclosure, the indication information may include: a time window and a period duration.

The time window is used to indicate a time range in which the UE performs the additional beam scanning. In an embodiment, the time window may be specific time range information, such as T1 to T2, in which the T1 represents a start time of the first additional beam scanning, and T2 represents an end time of the last additional beam scanning. In another embodiment, the above time window may also indicate a scanning start time, a preset number of times of scanning, or a preset scanning duration such as 10 minutes, which is not limited in the disclosure.

The above additional scanning period duration represents an interval duration between two adjacent times of additional beam scanning. In the embodiment of the disclosure, the above additional scanning period duration is less than a preset beam scanning period duration. The preset beam scanning period duration refers to a beam scanning period duration used to determine the initial matching beam pair information in the first preset operating mode. For example, beam scanning is performed every 5 ms to determine the optimal matching beam pair. The preset beam scanning period duration also refers to the scanning period interval duration used for the normal periodic beam scanning. Correspondingly, the above additional scanning period duration may be 4 ms, 3 ms, 2 ms and 1 ms.

The step 11-12 may include, the additional scanning result is obtained by performing periodic beam scanning according to the additional scanning period duration within the additional scanning time window.

For example, assuming that the additional scanning time window is T0 and the above additional scanning period is 3 ms, UE1 will start a timer, and within the T0 time window, an additional beam scanning is triggered every 3 ms to determine the optimal matching beam pair information in the current operating mode.

In the embodiments of the disclosure, the UE may use the periodic additional beam scanning to perform multiple times of regular additional beam scanning to obtain more accurate matching beam pair information. Subsequently, more accurate target beam offset information is obtained based on the multiple additional scanning results, and the accuracy of the target beam offset information is improved.

In the case 2, the time information for triggering the additional scanning is non-periodic trigger time indication information.

The non-periodic trigger time indication information may include: at least one additional scanning trigger time information that may be determined by the base station in real time according to actual service requirements.

Correspondingly, the step 11-12 may include: obtaining the additional scanning result by performing the additional beam scanning according to each additional scanning trigger time information.

In the embodiments of the disclosure, the base station may flexibly instruct the UE to perform the additional beam scanning according to actual service requirements, so as to determine the optimal matching beam pair information suitable for the current operating mode according to the additional scanning results obtained in real time, and further obtain the target beam offset information, thereby improving the flexibility of determining the target beam offset information. Meanwhile, the power consumption of the UE performing the additional beam scanning may be reduced.

In step 11-13, the target beam offset information is determined by processing the additional scanning result.

In an embodiment of the disclosure, after the UE1 obtains the above additional scanning result, the target beam offset information may be obtained by comparing the additional scanning result, i.e., the newly determined optimal matching beam pair information with the initial matching beam pair information.

Taking the case 1 of the above step 11-12 as an example, the application scenario shown in FIG. 1-1 is combined for a description. It is assumed that the UE1 determines the optimal matching beam pair in the second preset operating mode as (beam2, beam b) by an additional beam scanning manner, such as performing additional beam scanning every 3 ms, and the UE1 determines the initial matching beam pair in the first preset operating mode as (beam2, beam c) by performing beam scanning in the preset beam scanning period, for example, every 5 ms. The UE1 may determine the target beam offset information corresponding to the above preset operating mode change as, shifting one beam at the UE side according to the preset beam number sequence, for example, shifting one beam at the UE1 side to the right side as shown in FIG. 1-1.

It should be understood that the above example only takes a beam offset required at the UE side when a preset operating mode changes as an example, to illustrate the beam offset direction and the beam offset amount indicated by the target beam offset information. In another embodiment of the disclosure, when another preset operating mode changes, both the UE and the base station may need to perform beam offset based on the initial matching beam pair at the same time. For example, the target beam offset information indicates that the target beam offset information instructs the UE and the base station, respectively to shift a preset number of beams based on the preset beam number sequence, and the beam offset direction and beam offset amount indicated by the target beam offset information will vary due to the change of different operating modes, which is not limited in the disclosure.

In another embodiment of the disclosure, the UE1 may also report the additional scanning result to the base station, and the base station may compare the additional scanning result with the initial matching beam pair information to obtain the target beam offset information corresponding to the preset operating mode change. In the example as described above in combination with FIG. 1-1, the target beam offset information may be: shifting one beam to the right at the UE1 side. Similarly, in the case of another operating mode change, the above target beam offset information includes: information that instructs the base station and the UE to perform synchronous beam offset respectively.

The above describes in detail that the UE uses an additional beam scanning manner to determine the target beam offset information corresponding to the preset operating mode change.

The second manner for the UE implementing the step 11-1 is that, predicting the target beam offset information according to a preset model for beam offset prediction.

In the embodiment of the disclosure, the information transmission end such as the UE may predict the target beam offset information corresponding to the above information of the preset operating mode change according to the preset model for beam offset prediction.

The above preset model for beam offset prediction may be a mathematical model or an artificial neural network model determined by the system based on historical records of beam offset information.

Figure 6:
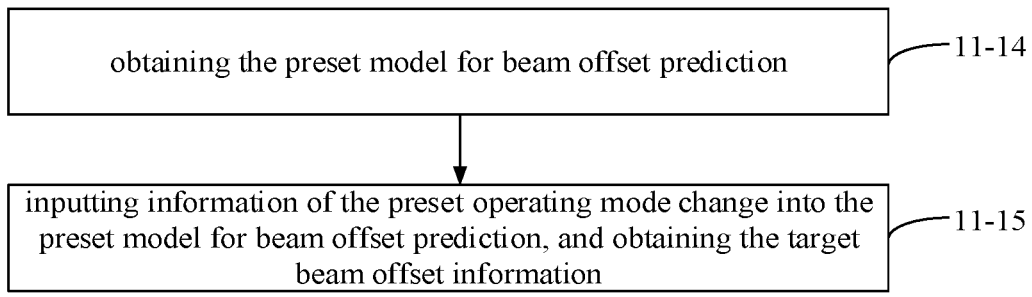
FIG. 6 is a flowchart illustrating another method for transmitting information according to an embodiment of the disclosure.

FIG. 6 is a flowchart illustrating another method for transmitting information according to an embodiment. The step 11-1 may include the following actions.

In step 11-14, the preset model for beam offset prediction is determined.

In the disclosure, the information transmission end, such as the UE, may determine the preset model for beam offset prediction in at least two manners.

In the manner 1, the corresponding preset model for beam offset prediction is obtained based on information such as a base station identifier and a type of UE.

Figure 7:
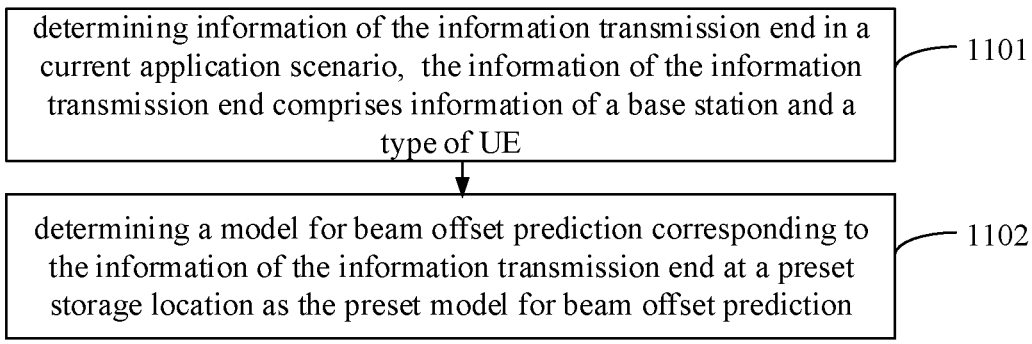
FIG. 7 is a flowchart illustrating another method for transmitting information according to an embodiment of the disclosure.

FIG. 7 is a flowchart illustrating another method for transmitting information according to an embodiment. The steps 11-14 may include the following actions.

In step 1101, information of the information transmission end in a current application scenario is determined, the information of the information transmission end includes information of a base station and a type of a user equipment.

The information of the base station may be an identifier of the base station, such as an identifier of the base station along the Beijing-Tianjin high-speed railway facilities. The type of the user equipment is the M-type smart phone UE1, and the same type of UE has the same antenna module configuration.

In step 1102, a model for beam offset prediction corresponding to the information of the information transmission end at a preset storage location is determined as the preset model for beam offset prediction.

The embodiments of the disclosure are applicable to the case where the preset model for beam offset prediction is not stored in the UE, or the preset model for beam offset prediction stored in the UE is not updated in time. For example, a duration between the latest update time and the current time has exceeded a preset threshold, such as, 30 days. The cloud server may store the preset model for beam offset prediction corresponding to the UEs with the same base station group and the same type of UEs. The same base station group may be multiple base stations arranged on a certain fixed line, such as a series of base stations along the Beijing-Tianjin high-speed railway facilities.

The above preset model for beam offset prediction may be trained based on beam offset data respectively measured by the information transmission end when any of various preset operating modes changes. The beam offset data refers to beam offset information determined by the additional beam scanning manner for the change of different operating modes when the UE passes through the base stations along the above line.

In the subsequent application stage of the model, it is assumed that a user carries the same type of UE passing through the line for the first time, for example, when the user carries an M-type smartphone for the first time and takes a preset high-speed train to drive from the train station A to the train station B, the smartphone may directly obtain a preset model for beam offset prediction from the preset storage location of the cloud or the base station side that is suitable for the M-type UE. When the preset operating mode changes with the same travel, the preset model for beam offset prediction may be used to automatically predict the target beam offset information, to rapidly determine the target matching beam pair information suitable for the current operating mode, thereby improving the beam pair adjustment efficiency.

In the manner 2, the preset model for beam offset prediction is trained with the beam offset history record data that meets a preset amount requirement as sample data.

Figure 8:
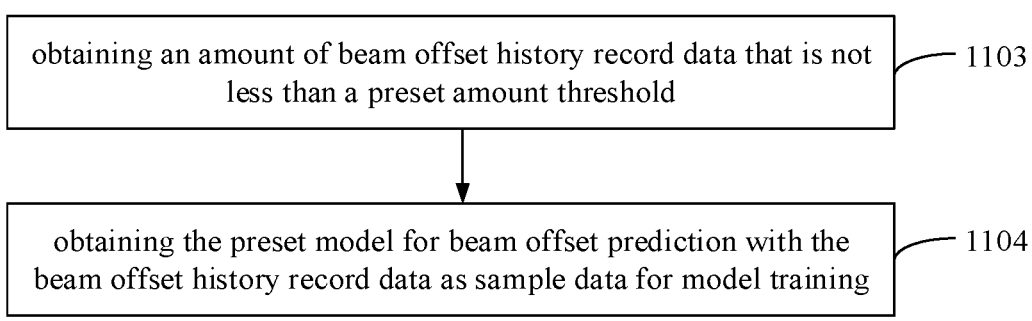
FIG. 8 is a flowchart illustrating another method for transmitting information according to an embodiment of the disclosure.

FIG. 8 is a flowchart illustrating another method for transmitting information according to an embodiment. The steps 11-14 may include the following actions.

In step 1103, an amount of beam offset history record data that is not less than a preset amount threshold is obtained.

Each piece of beam offset history record data may include: operating mode change information and beam offset information. The above beam offset information may be the target beam offset information determined by the additional beam scanning manner when the UE undergoes the preset operating mode change, for example, when the UE is on a high-speed train, and is switched from a low-speed movement mode to a high-speed movement mode relative to the base stations along the railway.

Each time the information transmission end completes the above additional beam scanning at a historical moment, the corresponding operating mode change information and the obtained beam offset information may be stored as a piece of historical record data in a preset storage resource, such as a cloud server, a base station or the UE. When enough data is stored, these history data is used as sample data to determine the preset model for beam offset prediction.

In step 1104, the preset model for beam offset prediction is obtained with the beam offset history record data as sample data for model training.

Taking the above beam offset history record data stored in the cloud server as an example, when enough beam offset history record data is stored in the cloud server, the cloud server, the base station, or the UE may use these data as sample data for mathematical modelling or use machine learning to train an artificial neural network model to obtain a preset model for beam offset prediction that can automatically predict the beam offset information.

In an embodiment, it is assumed that a user Xiao Ming carries the M-type smartphone and has taken a high-speed railway for N times, such as has taken the Beijing-Tianjin high-speed railway for 50 times, starting at the Beijing South station and ending at the Tianjin station. The locations of the base stations along the Beijing-Tianjin high-speed railway facilities are fixed. According to the operating principle of the high-speed railway, it is necessary to continuously adjust the matching beam pair information to adapt to the ever-increasing movement speed during the process from the high-speed railway starting to gradually accelerating to a preset speed such as 365 km/h.

Assuming that the matching beam pair adjustment process is performed within the coverage range of base station No. 1, for each preset operating mode change, such as from 80 km/h to 100 km/h, an additional beam scanning is required to determine the target beam offset information, thereby generating 50 pieces of beam offset history record data. A mathematical model can be fitted based on the above 50 pieces of beam offset history record data. For example, a linear fitting method is used to obtain a functional relationship between the speed change information and the beam offset.

In step 11-15, information of the preset operating mode change is input into the preset model for beam offset prediction to output the target beam offset information.

The above information of the preset operating mode change is a set of factors that enable the operating mode of the information transmission end to change, and may include: speed change information and location change information of the UE relative to the base station.

After determining the preset model for beam offset prediction, the information transmission end, such as a base station or UE, only needs to input the information of the preset operating mode change, such as speed change information, into the preset model for beam offset prediction to automatically calculate the target beam offset information applicable to the preset operating mode change.

Still as shown in the above example, when Xiao Ming carries the M-type smartphone to take the Beijing-Tianjin high-speed railway again, for example, for the 51th time. When the speed of the high-speed railway accelerates from 80 km/h to 100 km/h, Xiao Ming's smart phone can directly calculate the target beam offset information based on the above linear function and the current vehicle speed, thereby using the target beam offset information to adjust the initial matching beam pair, so as to obtain the target matching beam pair suitable for the current operating mode.

In another example, another user Xiao Shan carries the same type of smartphone, such as the M-type mobile phone and takes the Beijing-Tianjin high-speed railway for the first time, the Xiao Shan's smartphone can first obtain the above functional relationship from the cloud server, then calculate the required beam offset information by using the above functional relationship and the current vehicle speed, and subsequently adjust the initial matching beam pair by the beam offset information to obtain the target matching beam pair information suitable for the current operating mode.

In the embodiments of the disclosure, the information transmission end uses the second manner to determine the target beam offset information. Since there is no need to use the conventional beam scanning manner, that is, the additional beam scanning manner for re-determining the optimal matching beam pair information, the signaling overheads of transmitting the additional beam scanning configuration information between the UE and the base station is effectively saved, and wireless transmission resources are saved. In addition, the second manner can improve the efficiency of determining the target matching beam pair, further improve the adaptability of the information transmission end to the moving speed change, and ensure the information transmission performance of the UE moving at a high speed relative to the base station.

It should be noted here that the information transmission end may also use the combination of the first manner and the second manner in step 11-1 to determine the target beam offset information. For example, when the UE determines that a preset model for beam offset prediction suitable for its device type is stored in the cloud server, or when there is enough beam offset history record data, the above model prediction manner may be used to obtain the target beam offset information, thereby reducing system resource occupation and signaling overheads. Correspondingly, if the UE or the base station determines that the target beam offset information determined by the second manner is inaccurate, for example, the operating mode change information input to the preset model for beam offset prediction is greatly different from the operating model change information used in training the beam offset prediction model, the system feedbacks that the target matching beam pair obtained by the model prediction manner cannot achieve the expected transmission performance. At this time, the base station may instruct the UE to switch to the first manner, that is, the additional beam scanning manner for determining the target beam offset information, so as to obtain more accurate beam offset configuration information, so that the target matching beam pair information determined by the information transmission end according to the above beam offset configuration information is more accurate, thereby ensuring the information transmission performance between the base station and the UE.

In step 11-2, the beam offset configuration information is determined according to the target beam offset information.

The UE determines the target beam offset information according to the above additional beam scanning manner or model prediction manner. The implementation of this step 11-2 may also include two cases.

In the case 1, the UE may determine the beam offset configuration information according to the target beam offset information determined by the UE. Afterwards, the beam offset configuration information is reported to the base station, so that the base station can adaptively adjust the matching beam for the UE according to the above beam offset information to ensure smooth information transmission between the base station and the UE. In this case 1, the UE can adjust the uplink beam according to the beam offset configuration information determined by the UE. At the same time, the base station synchronously adjusts the corresponding downlink beam according to the above beam offset configuration information determined by the UE, thereby re-determining the target matching beam pair to carry the information transmission between the UE and the base station.

In the case 2, the UE sends the determined target beam offset information to the base station, and the base station determines the beam offset configuration information according to the target beam offset information.

Figure 9:
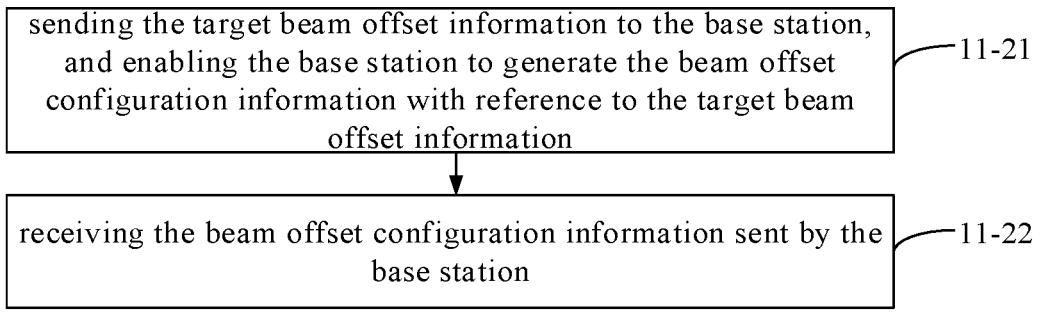
FIG. 9 is a flowchart of another method for transmitting information according to an embodiment of the disclosure.

FIG. 9 is a flowchart illustrating another method for transmitting information according to an embodiment. The step 11-2 may include the following actions.

In step 11-21, the target beam offset information is sent to the base station, so that the base station generates the beam offset configuration information with reference to the target beam offset information.

Taking the 5G NR system as an example, in the 5G mobile communication network, the base station is still in a dominant position, that is, the UE transmits information according to the instructions of the base station. Therefore, the UE can send the acquired target beam offset information to the base station, so that the base station generates the beam offset configuration information with reference to the target beam offset information determined by the UE.

In the process in which the base station generates the beam offset configuration information with reference to the target beam offset information determined by the UE, the base station may regard the above target beam offset information as accurate information, and then generate the beam offset configuration information. The base station may determine beam offset information by itself as the criterion while only the target beam offset information determined by the UE is considered as reference information, or the target beam offset information determined by the UE may be used to correct the beam offset information determined by the base station itself, and the beam offset configuration information is generated according to the corrected beam offset information.

In step 11-22, the beam offset configuration information sent by the base station is received.

After the base station determines the above beam offset configuration information, the above beam offset configuration information may be sent to the UE, so that the UE adjusts the initial matching beam pair in the first preset operating mode according to the beam offset configuration information.

In step 12, the initial matching beam pair is adjusted according to the beam offset configuration information in response to detecting a switch from the first preset operating mode to the second preset operating mode, so as to obtain a target matching beam pair.

After the information transmission end, such as the base station or the UE, obtains the beam offset configuration information, when the preset operating mode changes, the initial matching beam pair may be adjusted in time according to the beam offset configuration information to obtain the target matching beam pair that adapts to the operating mode change.

In the disclosure, depending on different execution objects, the implementation of the above step 12 may include the following actions.

In the case 1, when the UE learns that it has switched from the first preset operating mode to the second preset operating mode, for example when the UE determines that it needs to switch from the first preset operating mode to the second preset operating mode with the base station according to the speed change information detected by the built-in speed sensor, the base station is informed to adjust the downlink beam (such as the beam 2 in FIG. 1-1) in the initial matching beam pair according to the above beam offset configuration information. The UE itself synchronously adjusts the uplink beam (such as the beam c in FIG. 1-1) in the initial matching beam pair according to the above beam offset configuration information, to obtain the target matching beam pair in the second preset operating mode.

In the case 2, when the base station learns that the UE switches from the first preset operating mode to the second preset operating mode, for example when the base station determines that it needs to switch from the first preset operating mode to the second preset operating mode with the UE according to the speed information reported by the UE, the UE is instructed to adjust the uplink beam in the initial matching beam pair according to the above beam offset configuration information, and the base station itself synchronously adjusts the downlink beam in the initial matching beam pair according to the above beam offset configuration information, to obtain the target matching beam pair applicable to the second preset operating mode. Still taking the UE1 shown in FIG. 1-1 as an example, it is assumed that after the above beam offset configuration information instructs the UE1 to switch from the first preset operating mode to the second preset operating mode, the beam pair information is adjusted by shifting one beam to the right as shown in FIG. 1-1.

After the UE1 enters the second preset operating mode, the initial matching beam pair (beam 2, beam c) is adjusted according to the beam offset configuration information, and the adjusted beam pair (beam 2, beam b) is determined as the optimal matching beam pair in the second preset operating mode.

Figure 10:
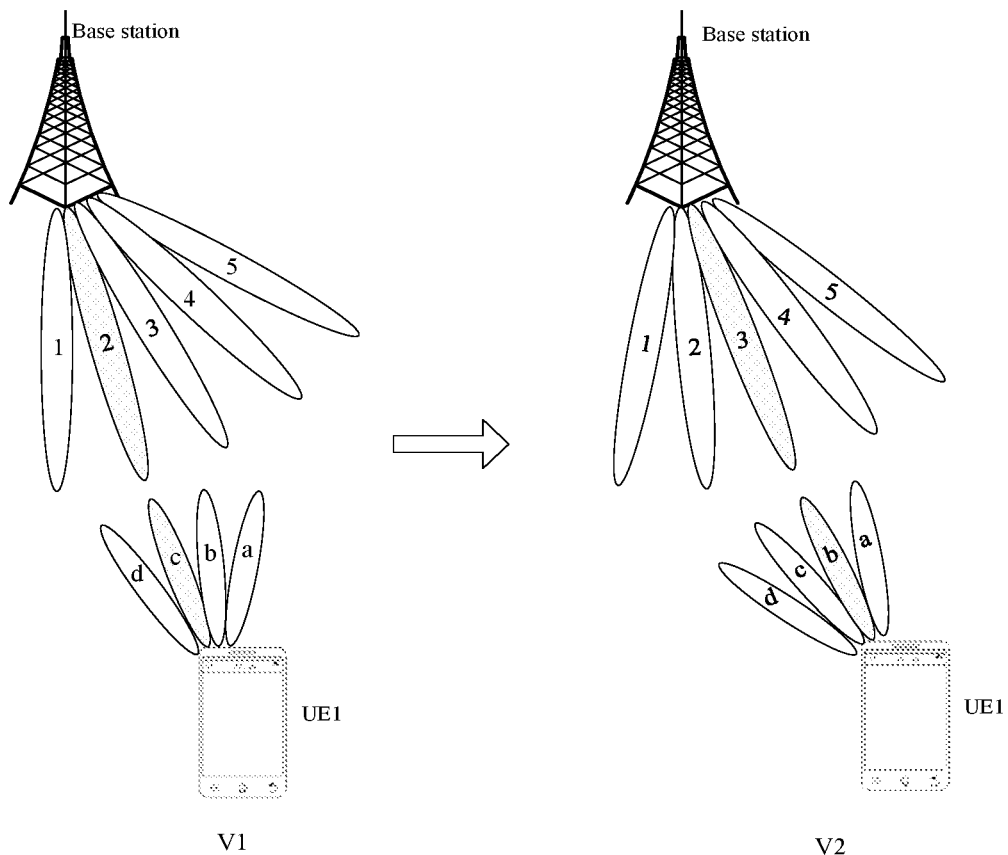
FIG. 10 is a schematic diagram illustrating another application scenario for transmitting information according to an embodiment of the disclosure.

As described above, the example only takes the beam offset required at the UE side when a preset operating mode changes as an example to illustrate how to automatically adjust the matching beam pair information. In the case where another preset operating mode changes, the UE and the base station may need to adjust the beam pair information based on the initial matching beam pair at the same time. For example, the target beam offset information instructs the UE and the base station, respectively to shift a preset number of beams in a direction of the preset beam number sequence. In this case, the UE and the base station adjust the beam pair information synchronously according to the above beam offset configuration information. For example, as illustrated in FIG. 10, when the moving speed of the UE1 relative to the base station increases from V1 to V2, it indicates that the UE and the base station need to switch from the first preset operating mode to the second preset operating mode, and UE1 and the base station are required to adjust the matching beam pair information synchronously, i.e., the UE1 and the base station respectively shift one beam according to the preset beam number sequence. The initial matching beam pair (beam 2, beam c) in the first preset operating mode is adjusted to the target matching beam pair (beam 3, beam b) in the second preset operating mode.

In step 13, information is transmitted in the second preset operating mode according to the target matching beam pair.

Correspondingly, as shown in the example of FIG. 10, the UE1 transmits information to the base station through the target matching beam pair (beam 3, beam b) in a high-speed movement mode such as an application scenario with a moving speed of V2.

In another embodiment of the disclosure, the beam offset configuration information may include, in addition to the target beam offset information, time information suitable for beam offset. For example, assuming that the time information suitable for beam offset is 1 minute, both the UE and the base station may continuously adjust the beam pair information based on the above target beam offset information within 1 minute. As illustrated in FIG. 10, within 1 minute, the base station and the UE sequentially adjust the optimal matching beam pair as (beam 3, beam b) and (beam 4, beam a) according to the target beam offset information, for regular adjustment.

As seen above, in the information transmission method according to the disclosure, when the UE and the base station are switched from the first preset operating mode to the second preset operating mode, there is no need to change the beam scanning strategy for determining the optimal matching beam pair in real time, and the optimal matching beam pair information in the second preset operating mode may be predicted according to the predetermined beam offset configuration information while maintaining the preset beam scanning period in the first preset operating mode, which effectively solves the technical problem that it is difficult to determine in real time the optimal matching beam pair based on the beam scanning method in the high-speed movement scenario of the UE relative to the base station, so that the information transmission performance between the UE and the base station in the fast-moving scenario may be effectively improved, and power consumption at the information transmission end may be saved.

The method for transmitting information according to the disclosure has been described above with the UE as the executive object.

Figure 11:
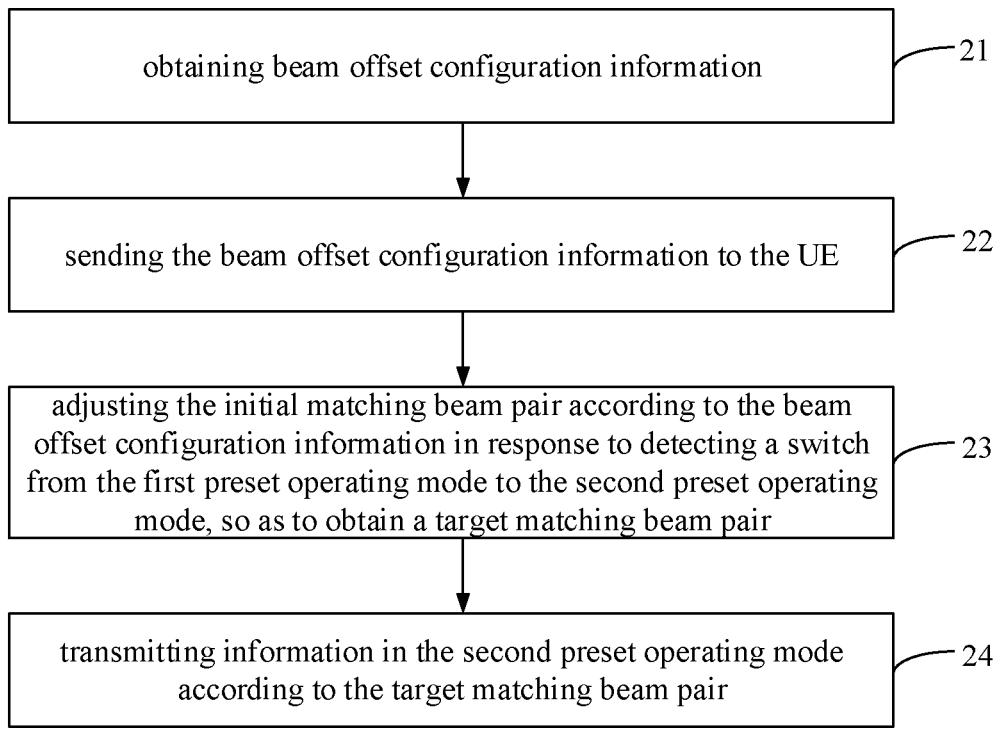
FIG. 11 is a flowchart illustrating a method for transmitting information according to an embodiment of the disclosure.

Correspondingly, the disclosure also provides a method for transmitting information, which is applied to a base station. FIG. 11 is a flowchart illustrating a method for transmitting information according to an embodiment, the method may include the following actions.

In step 21, beam offset configuration information is obtained. The beam offset configuration information is used to instruct an information transmission end to adjust an initial matching beam pair in a first preset operating mode when there is a preset operating mode change, so as to determine a target matching beam pair in a second preset operating mode. The preset operating mode change indicates that the information transmission end is switched from the first preset operating mode to the second preset operating mode.

Figure 12:
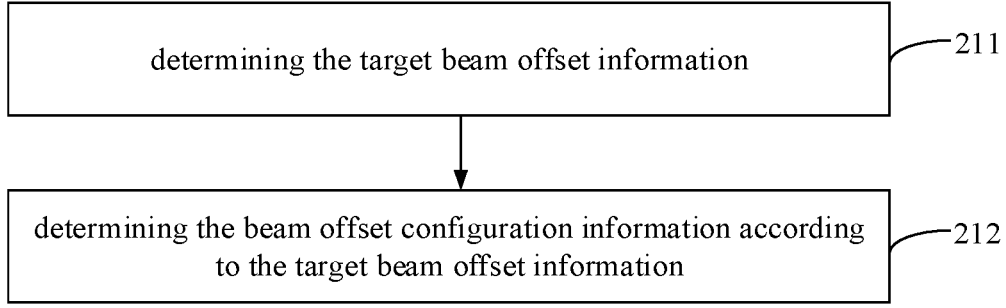
FIG. 12 is a flowchart illustrating another method for transmitting information according to an embodiment of the disclosure.

FIG. 12 is a flowchart illustrating a method for transmitting information according to an embodiment. The step 21 may include the following actions.

In step 211, the target beam offset information is determined.

The target beam offset information is used to indicate the beam offset direction and the beam offset amount.

For the base station, the following three manners are used to determine the target beam offset information.

In the Manner 1, the target beam offset information sent by the UE is received, which may refer to the description of the foregoing embodiment in which the UE determines the target beam offset information, which is not repeated here.

In the Manner 2, the target beam offset information is determined according to the additional scanning result sent by the UE.

Figure 13:
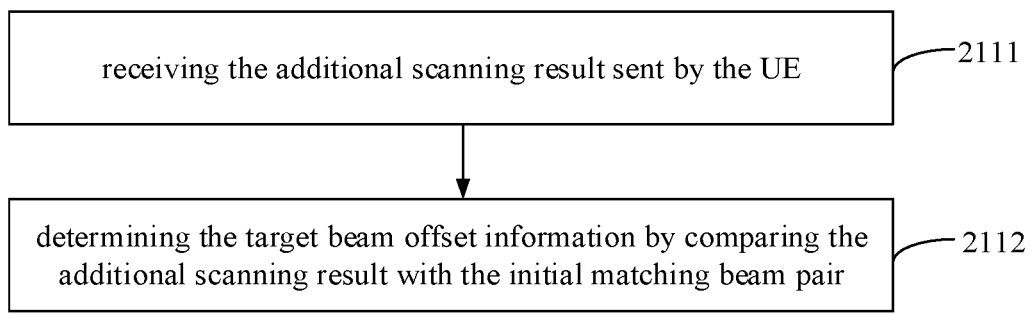
FIG. 13 is a flowchart illustrating another method for transmitting information according to an embodiment of the disclosure.

FIG. 13 is a flowchart illustrating another method for transmitting information according to an embodiment. The above step 211 may include the following actions.

In step 2111, an additional scanning result sent by the UE is received.

The additional scanning result is the optimal matching beam pair information obtained by the UE performing the additional beam scanning according to preset scanning configuration information.

In step 2112, the target beam offset information is determined by comparing the additional scanning result with the initial matching beam pair.

The embodiment corresponds to the embodiment shown in FIG. 4, and the above step 2112 is similar to an implementation process of the step 11-13 in FIG. 4, in which the execution objects are different, and the specific implementation process of step 2112 can refer to the step 11-13 in FIG. 4.

Figure 14:
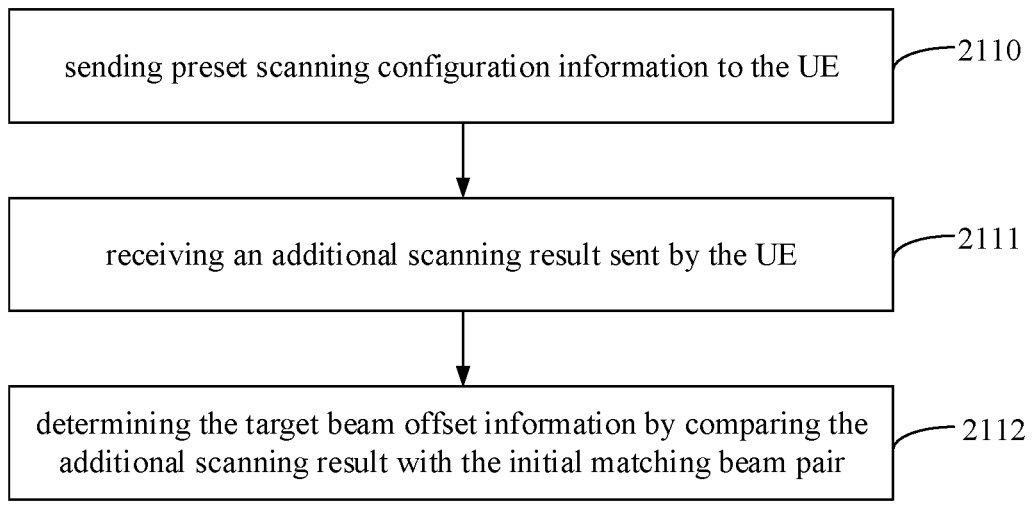
FIG. 14 is a flowchart illustrating another method for transmitting information according to an embodiment of the disclosure.

FIG. 14 is a flowchart illustrating another method for transmitting information according to an embodiment. Before step 2111, the step 211 may further include the following actions.

In step 2110, the preset scanning configuration information is sent to the UE. The scanning configuration information is configured to instruct the UE to perform the above additional beam scanning, to obtain the additional scanning result.

In an embodiment of the disclosure, the base station may send the above preset scanning configuration information to the UE when the UE accesses its covered cell.

In another embodiment of the disclosure, the base station sends the preset scanning configuration information to the UE in real time under any of the following conditions: the base station detects that the information transmission performance in the current operating mode is lower than a preset transmission performance threshold; or there are preset service requirements, which may refer to the above description of the first preset trigger condition, which will not be repeated here.

In the Manner 3, similar to the UE using the beam offset prediction model to automatically determine the target beam offset information, in the embodiments of the disclosure, the base station can also use the beam offset prediction model corresponding to the above type of UE to automatically obtain the target beam offset information.

In conclusion, in the disclosure, the base station may also determine the target beam offset information according to the additional beam scanning manner, and/or predict the target beam offset information according to the preset model for beam offset prediction.

In step 212, the beam offset configuration information is determined according to the target beam offset information.

This step corresponds to the above step 11-21 (see the above).

In step 22, the beam offset configuration information is sent to the UE.

This step 22 belongs to the step corresponding to step 11-22, which will not be described in detail here. In another embodiment of the disclosure, this step is not a necessary step. For example, in the above embodiment in which the UE itself determines the beam offset configuration information, the base station does not need to send the beam offset configuration information to the UE.

In step 23, the initial matching beam pair is adjusted according to the beam offset configuration information in response to detecting a switch from the first preset operating mode to the second preset operating mode, so as to obtain a target matching beam pair.

In the embodiment of the disclosure, this step 23 is similar to the step 12 (see the above).

In step 24, information is transmitted in the second preset operating mode according to the target matching beam pair.

After determining the target matching beam pair corresponding to the second preset operating mode, the base station can use the adjusted target downlink beam (such as the beam 3 shown in FIG. 10) to send downlink information to the UE and receive information sent by the UE using the adjusted target uplink beam (such as the beam b shown in FIG. 10).

Figure 15:
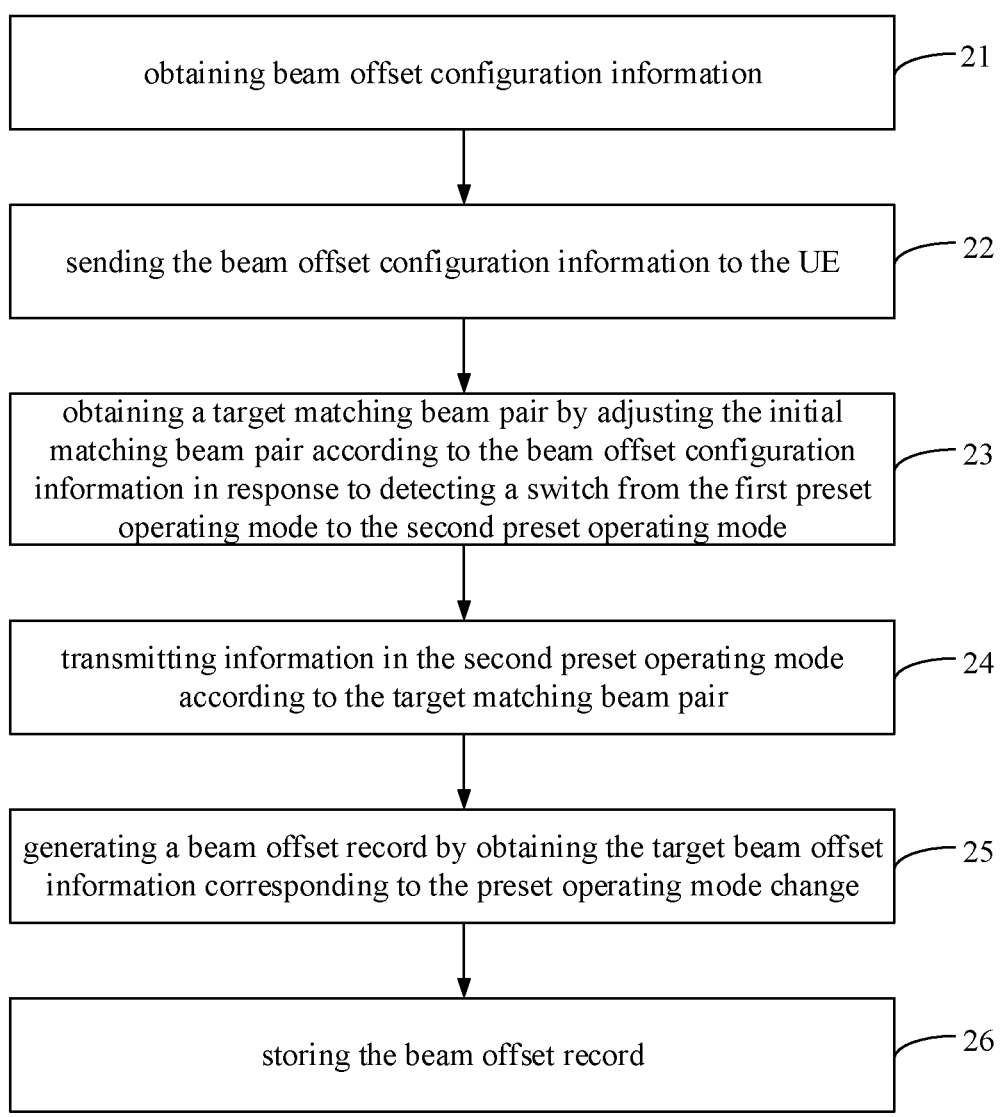
FIG. 15 is a flowchart illustrating another method for transmitting information according to an embodiment of the disclosure.

FIG. 15 is a flowchart illustrating another method for transmitting information according to an exemplary embodiment. The method further includes the following actions.

In step 25, the target beam offset information corresponding to the preset operating mode change is obtained, and a beam deviation record is generated.

In step 26, the beam offset record is stored.

In the disclosure, the base station may generate and store locally a piece of beam offset record for the preset type of UE based on the determined target beam offset information in an application scenario where the operating mode changes when it communicates with the preset type of UE. Or the beam offset record is sent to a cloud server for storage, so that the base station, the UE or the cloud server can use the above beam offset record as the sample data to train the beam offset prediction model.

Figure 16:
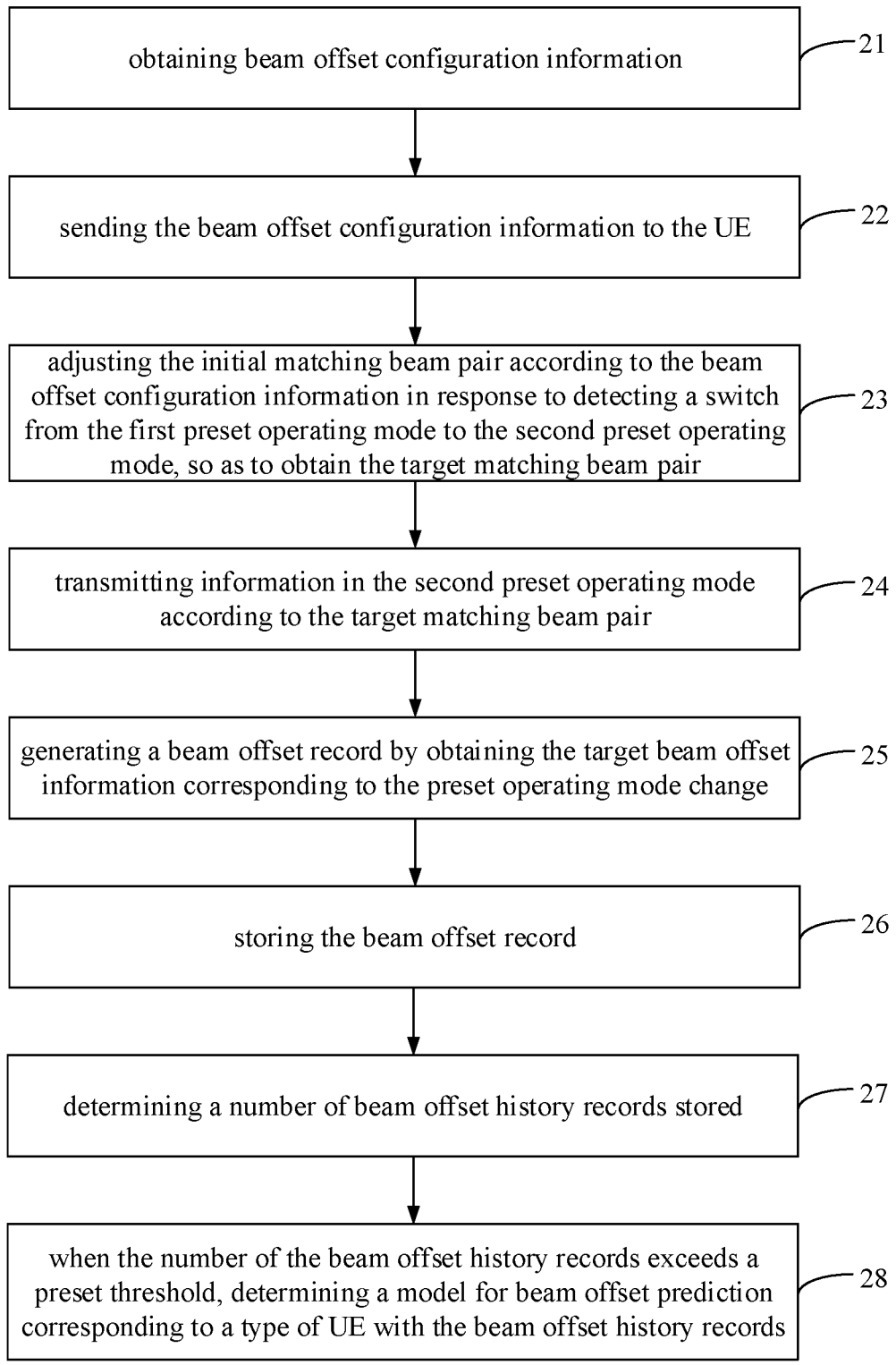
FIG. 16 is a flowchart illustrating another method for transmitting information according to an embodiment of the disclosure.

FIG. 16 is a flowchart illustrating another method for transmitting information according to an embodiment. The method may further include the following actions.

In step 27, a number of beam offset history records stored are determined.

In step 28, when the number of the beam offset history records exceeds a preset threshold, a model for beam offset prediction corresponding to a type of the user equipment is determined with the beam offset history records.

The embodiment is similar to the foregoing embodiment where the UE trains the beam offset prediction model by using the beam offset history record data that meets the amount requirement, which will not be repeated here.

It should be noted that when the storage resources of the UE are sufficient and the data processing capability meets processing requirements, the beam offset records may be stored and the beam offset prediction model may be determined, and the beam offset records or the determined beam offset prediction model may be uploaded to the cloud server.

In conclusion, in the information transmission method according to the disclosure, when the UE and the base station use high-frequency beams to transmit information, if the matching beam pair between the base station and the UE needs to be changed frequently, which means that the interoperable operating mode between the base station and the UE changes frequently, such as an application scenario where the UE moves at a high speed relative to the base station, the beam scanning method for determining the optimal matching beam pair in real time may cause that the efficiency of the optimal matching beam pair determined by the information transmission end cannot match the beam pair change rate caused by the high-speed movement of the UE since each beam scanning takes a period of time, and power consumption is also high. In view of the above situation, in the disclosure, the information transmission end may pre-determine the beam offset configuration information applicable to the preset operating mode change before the operating mode change occurs. When the preset operating mode change occurs, i.e., the base station and the UE are switched from the first preset operating mode to the second preset operating mode, the information transmission end can directly adjust the initial matching beam pair in the first preset operating mode according to the predetermined beam offset configuration information to obtain the optimal matching beam pair in the second preset operating mode. Since the above beam pair adjustment process does not require beam scanning, the efficiency of beam pair adjustment may be effectively improved, thereby adapting to application scenarios where beam pair needs to change frequently (such as improving a capacity of the information transmission end adaptive to an application scene with a high-speed movement), ensuring the information transmission performance of the UE and the base station in the above application scenarios, saving the signaling overheads required for the UE performing real-time beam scanning, and saving the power consumption of the UE and the base station.

For simple description, the above method embodiments are all expressed as a combination of a series of actions, but those skilled in the art should know that the disclosure is not limited by the described sequence of actions, some steps in the disclosure may be performed in other order or simultaneously.

Secondly, those skilled in the art should also know that the embodiments described in the specification are optional embodiments, and the involved actions and modules are not necessarily required by the disclosure.

Corresponding to the foregoing method embodiments of implementing application function, the disclosure also provides apparatus and terminal embodiments of implementing application function.

Correspondingly, the disclosure provides an apparatus for transmitting information, which is set in a user equipment.

Figure 17:
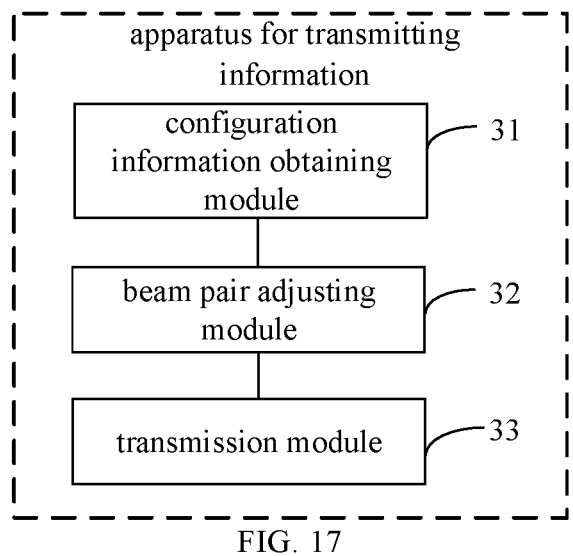
FIG. 17 is a block diagram illustrating an apparatus for transmitting information according to an embodiment of the disclosure.

FIG. 17 is a block diagram illustrating an apparatus for transmitting information according to an embodiment, the apparatus may include: a configuration information obtaining module 31, configured to obtain beam offset configuration information for instructing an information transmission end to adjust an initial matching beam pair in a first preset operating mode when there is a preset operating mode change, so as to determine a target matching beam pair in a second preset operating mode. The preset operating mode change indicates that the information transmission end is switched from the first preset operating mode to the second preset operating mode.

In an apparatus embodiment of the disclosure, the beam offset configuration information may include: target beam offset information, and the target beam offset information indicates a beam offset direction and a beam offset amount.

The apparatus further includes: a beam pair adjusting module 32 and a transmission module 33.

The beam pair adjusting module 32 is configured to adjust the initial matching beam pair according to the beam offset configuration information in response to detecting a switch from the first preset operating mode to the second preset operating mode, so as to obtain the target matching beam pair.

The transmission module 33 is configured to transmit information in the second preset operating mode according to the target matching beam pair.

Figure 18:
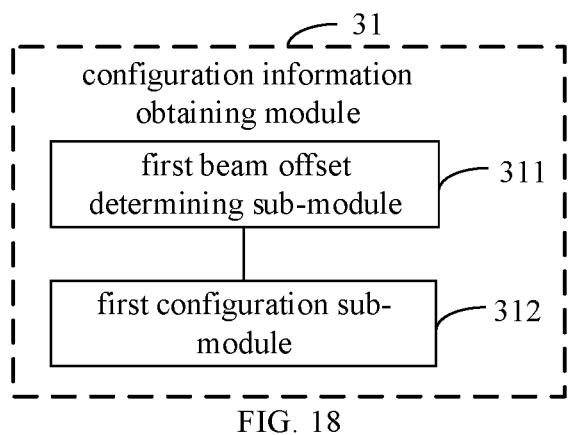
FIG. 18 is a block diagram illustrating another apparatus for transmitting information according to an embodiment of the disclosure.

FIG. 18 is a block diagram illustrating another apparatus for transmitting information according to an embodiment. Based on the apparatus embodiment shown in FIG. 17, the configuration information obtaining module 31 may include: a first beam offset determining sub-module 311 and a first configuration sub-module 312.

The first beam offset determining sub-module 311 is configured to determine the target beam offset information by performing additional beam scanning.

The first configuration sub-module 312 is configured to determine the beam offset configuration information according to the target beam offset information.

Figure 19:
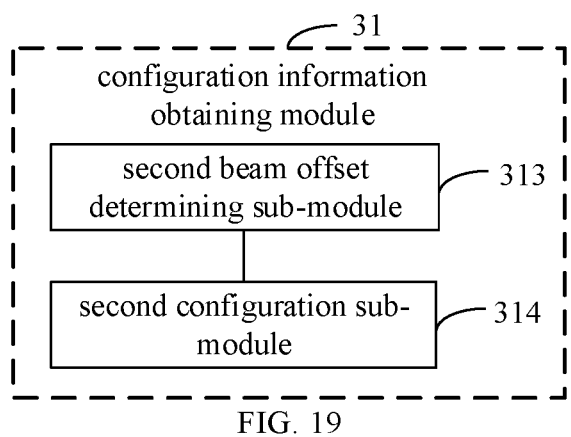
FIG. 19 is a block diagram illustrating another apparatus for transmitting information according to an embodiment of the disclosure.

FIG. 19 is a block diagram illustrating another apparatus for transmitting information according to an embodiment. Based on the apparatus embodiment shown in FIG. 17, the configuration information obtaining module 31 may include: a second beam offset determining sub-module 313 and a second configuration sub-module 314.

The second beam offset determining sub-module 313 is configured to predict the target beam offset information by a preset model for beam offset prediction.

The second configuration sub-module 314 is configured to determine the beam offset configuration information according to the target beam offset information.

Figure 20:
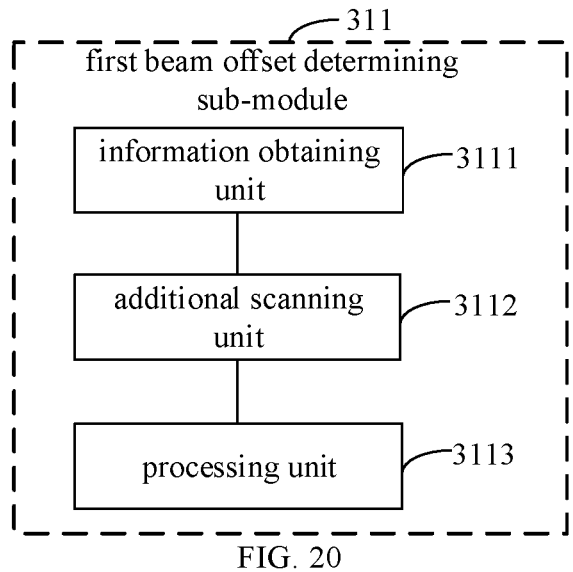
FIG. 20 is a block diagram illustrating another apparatus for transmitting information according to an embodiment of the disclosure.

FIG. 20 is a block diagram illustrating another apparatus for transmitting information according to an embodiment. Based on the apparatus embodiment shown in FIG. 18, the first beam offset determining sub-module 311 may include: an information obtaining unit 3111, an additional scanning unit 3112 and a processing unit 3113.

The information obtaining unit 3111 is configured to obtain scanning configuration information for instructing the user equipment to perform the additional beam scanning according to preset time indication information.

The additional scanning unit 3112 is configured to obtain an additional scanning result by performing the additional beam scanning based on the scanning configuration information.

In an apparatus embodiment of the disclosure, the scanning configuration information obtained by the above information obtaining unit 3111 may include: a time window and a period duration.

Correspondingly, the additional scanning unit 3112 may be configured to obtain the additional scanning result by performing periodic beam scanning according to the period duration within the time window.

In another apparatus embodiment of the disclosure, the scanning configuration information obtained by the above information obtaining unit 3111 may include at least one piece of time information for triggering the additional scanning.

Correspondingly, the additional scanning unit 3112 may be configured to obtain the additional scanning result by performing the additional beam scanning according to each piece of time information.

The processing unit 3113 is configured to determine the target beam offset information by processing the additional scanning result.

In the disclosure, the processing unit 3113 may be configured to: determine the target beam offset information by comparing the additional scanning result with the initial matching beam pair; or determine the target beam offset information by sending the additional scanning result to a base station, and enabling the base station to compare the additional scanning result with the initial matching beam pair.

In an apparatus embodiment of the disclosure, the information obtaining unit 3111 may include: an information receiving sub-unit and an information determining sub-unit.

The information receiving sub-unit is configured to receive the scanning configuration information sent by a base station in real time.

The information determining sub-unit is configured to determine the scanning configuration information according to preset system convention information.

In another apparatus embodiment of the disclosure, the information receiving sub-unit may be configured to receive the scanning configuration information sent by the base station under a first preset trigger condition. The first preset trigger condition includes any one of the following: the base station detects that information transmission performance in the current operating mode is lower than a preset transmission performance threshold; and the base station currently accessed by the user equipment has preset service requirements.

Figure 21:
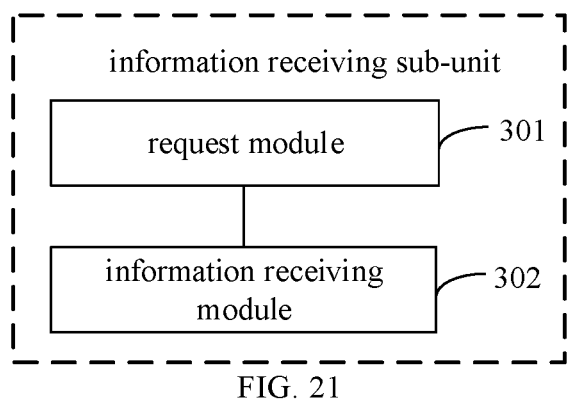
FIG. 21 is a block diagram illustrating another apparatus for transmitting information according to an embodiment of the disclosure.

FIG. 21 is a block diagram illustrating another apparatus for transmitting information according to an embodiment. Based on the apparatus embodiment shown in FIG. 20, the information receiving sub-unit may include: a request module 301 and an information receiving module 302.

The request module 301 is configured to send an additional scanning configuration request to the base station when a second preset trigger condition is detected.

The second preset trigger condition includes any one of the following: the user equipment is configured to be in the second preset operating mode; and current preset parameter information indicates that the user equipment enters the second preset operating mode.

The information receiving module 302 is configured to receive the scanning configuration information sent by the base station responding to the additional scanning configuration request.

Figure 22:
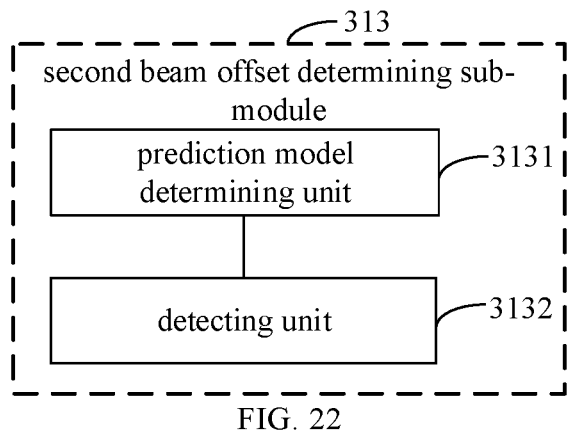
FIG. 22 is a block diagram illustrating another apparatus for transmitting information according to an embodiment of the disclosure.

FIG. 22 is a block diagram illustrating another apparatus for transmitting information according to an embodiment. Based on the apparatus embodiment shown in FIG. 19, the second beam offset determining sub-module 313 may include: a prediction model determining unit 3131 and a detecting unit 3132.

The prediction model determining unit 3131 is configured to determine the preset model for beam offset prediction based on a preset number of beam offset history records.

The detecting unit 3132 is configured to input information of the preset operating mode change into the preset model for beam offset prediction, and obtain the target beam offset information suitable for the preset operating mode change.

Figure 23:
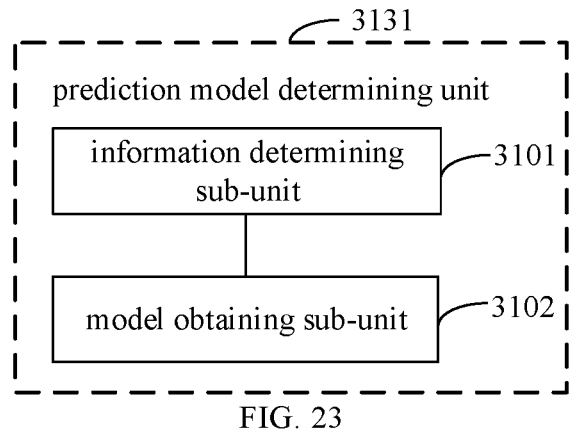
FIG. 23 is a block diagram illustrating an apparatus for transmitting information according to an embodiment of the disclosure.

FIG. 23 is a block diagram illustrating another apparatus for transmitting information according to an embodiment. Based on the apparatus embodiment shown in FIG. 22, the prediction model determining unit 3131 may include: an information determining sub-unit 3101 and a model obtaining sub-unit 3102.

The information determining sub-unit 3101 is configured to determine information of the information transmission end in a current application scenario. The information of the information transmission end includes information of a base station and a type of a user equipment.

The model obtaining sub-unit 3102 is configured to determine a model for beam offset prediction corresponding to the information of the information transmission end at a preset storage location as the preset model for beam offset prediction.

Figure 24:
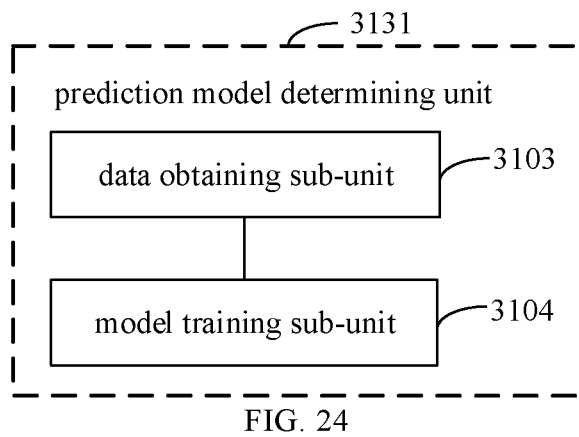
FIG. 24 is a block diagram illustrating another apparatus for transmitting information according to an embodiment of the disclosure.

FIG. 24 is a block diagram illustrating another apparatus for transmitting information according to an embodiment. Based on the apparatus embodiment shown in FIG. 22, the prediction model determining unit 3131 may include: a data obtaining sub-unit 3103 and a model training sub-unit 3104.

The data obtaining sub-unit 3103 is configured to obtain an amount of beam offset history record data that is not less than a preset amount threshold. Each piece of beam offset history record data includes operating mode change information and beam offset information.

The model training sub-unit 3104 is configured to obtain the preset model for beam offset prediction with the beam offset history record data as sample data for model training.

In an apparatus embodiment of the disclosure, the beam pair adjusting module 32 may be configured to adjust the initial matching beam pair according to the beam offset configuration information to obtain the target matching beam pair under any one of the following conditions: learning that a local end is switched from the first preset operating mode to the second preset operating mode; or learning that the information transmission end communicating with the local end is switched from the first preset operating mode to the second preset operating mode.

When the local end is a user equipment, the information transmission end is a base station; when the local end is the base station, the information transmission end is the user equipment.

Figure 25:
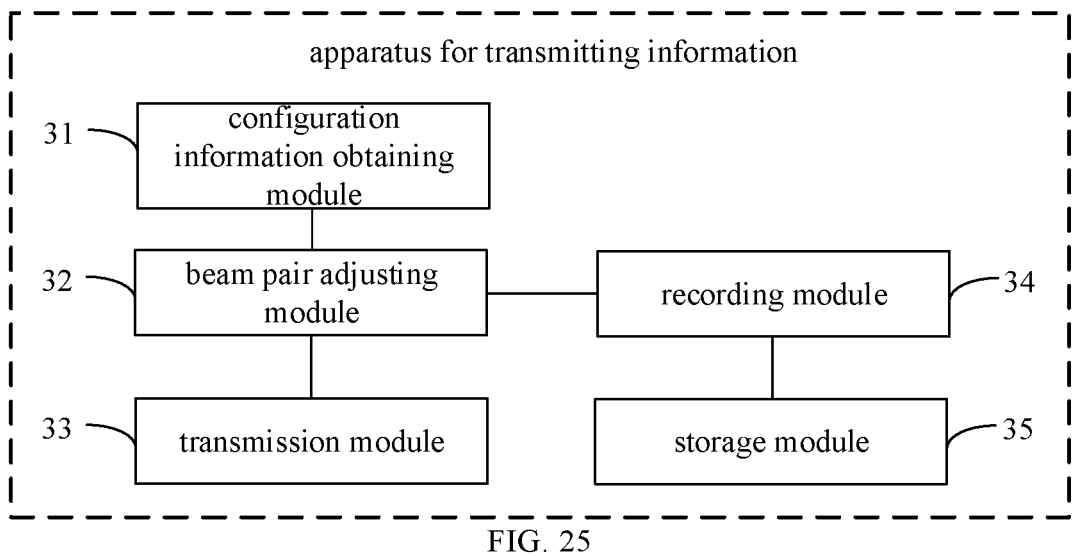
FIG. 25 is a block diagram illustrating another apparatus for transmitting information according to an embodiment of the disclosure.

FIG. 25 is a block diagram illustrating another apparatus for transmitting information according to an embodiment. Based on the apparatus embodiment shown in FIG. 17, the apparatus may further include: a recording module 34 and a storage module 35.

The recording module 34 is configured to generate a beam offset record by obtaining the target beam offset information corresponding to the preset operating mode change.

The storage module 35 is configured to locally store the beam offset record.

In an apparatus embodiment of the disclosure, the storage module 35 may be configured to send the beam offset record to a cloud server or a base station for storage.

Figure 26:
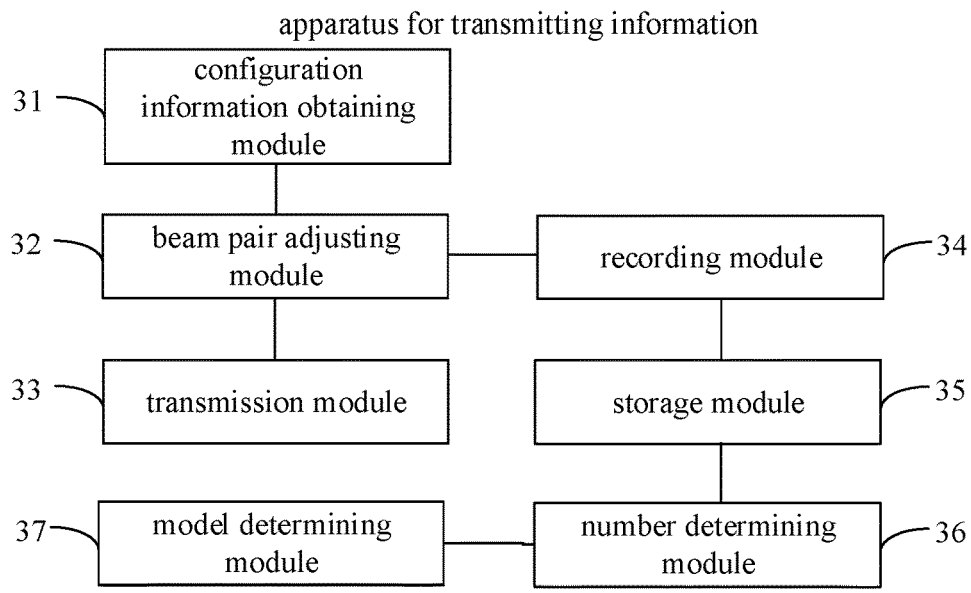
FIG. 26 is a block diagram illustrating another apparatus for transmitting information according to an embodiment of the disclosure.

FIG. 26 is a block diagram illustrating another apparatus for transmitting information according to an embodiment. Based on the apparatus embodiment shown in FIG. 25, the apparatus may further include: a number determining module 36 and a model determining module 37.

The number determining module 36 is configured to determine a number of beam offset history records stored in local or in the cloud server.

The model determining module 37 is configured to, when the number of the beam offset history records exceeds a preset threshold, determine a model for beam offset prediction corresponding to a type of the user equipment with the beam offset history records.

Corresponding to the above embodiment of the method for transmitting information applied to a base station, the disclosure also provides an apparatus for transmitting information, which may be set in the base station.

Figure 27:
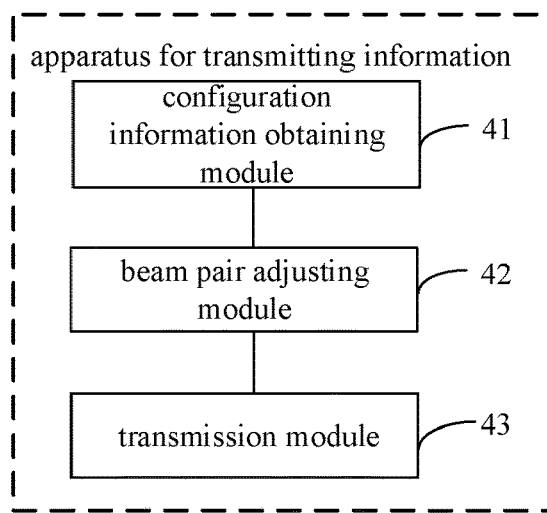
FIG. 27 is a block diagram illustrating another apparatus for transmitting information according to an embodiment of the disclosure.

FIG. 27 is a block diagram illustrating an apparatus for transmitting information according to an embodiment. The apparatus may include: a configuration information obtaining module 41.

The configuration information obtaining module 41 is configured to obtain beam offset configuration information. The beam offset configuration information is used to instruct an information transmission end to adjust an initial matching beam pair in a first preset operating mode when there is a preset operating mode change, so as to determine a target matching beam pair in a second preset operating mode. The preset operating mode change indicates that the information transmission end is switched from the first preset operating mode to the second preset operating mode.

In an apparatus embodiment of the disclosure, the beam offset configuration information includes target beam offset information for indicating a beam offset direction and a beam offset amount.

The apparatus may also include a beam pair adjusting module 42, configured to adjust the initial matching beam pair according to the beam offset configuration information in response to detecting a switch from the first preset operating mode to the second preset operating mode, so as to obtain the target matching beam pair.

In an apparatus embodiment of the disclosure, the beam pair adjusting module may be configured to adjust the initial matching beam pair according to the beam offset configuration information to obtain the target matching beam pair under any one of the following conditions: learning that a local end is switched from the first preset operating mode to the second preset operating mode; or learning that the information transmission end communicating with the local end is switched from the first preset operating mode to the second preset operating mode.

When the local end is a user equipment, the information transmission end is a base station; when the local end is the base station, the information transmission end is the user equipment.

The apparatus may also include a transmission module 43, configured to transmit information in the second preset operating mode according to the target matching beam pair.

Figure 28:
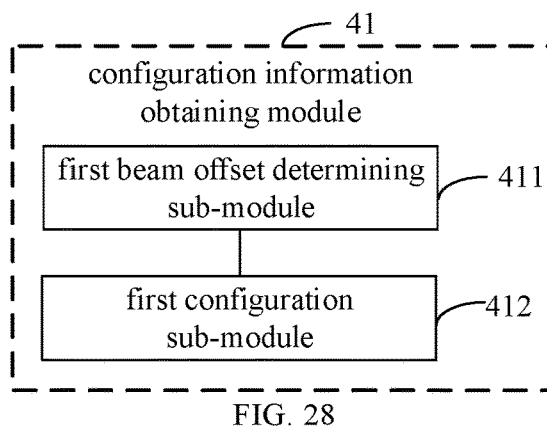
FIG. 28 is a block diagram illustrating another apparatus for transmitting information according to an embodiment of the disclosure.

FIG. 28 is a block diagram illustrating another apparatus for transmitting information according to an embodiment. Based on the apparatus embodiment shown in FIG. 27, the configuration information obtaining module 41 may include: a first beam offset determining sub-module 411 and a first configuration sub-module 412.

The first beam offset determining sub-module 411 is configured to determine the target beam offset information by performing additional beam scanning.

The first configuration sub-module 412 is configured to determine the beam offset configuration information according to the target beam offset information.

Figure 29:
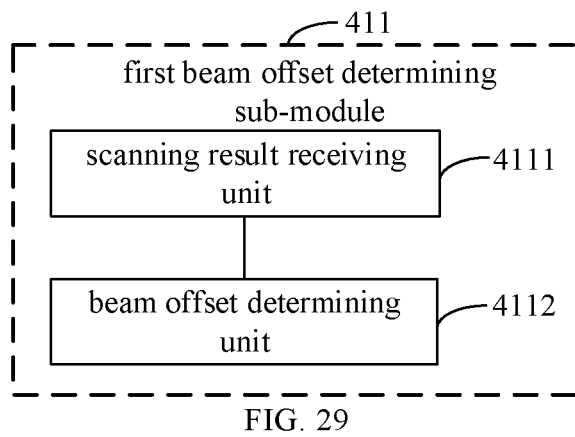
FIG. 29 is a block diagram illustrating another apparatus for transmitting information according to an embodiment of the disclosure.

FIG. 29 is a block diagram illustrating another apparatus for transmitting information according to an embodiment. Based on the apparatus embodiment shown in FIG. 28, the first beam offset determining sub-module 411 may include: a scanning result receiving unit 4111 and a beam offset determining unit 4112.

The scanning result receiving unit 4111 is configured to receive the additional scanning result sent by the user equipment. The additional scanning result is the optimal matching beam pair obtained by the user equipment performing the additional beam scanning according to preset scanning configuration information.

The beam offset determining unit 4112 is configured to determine the target beam offset information by comparing the additional scanning result with the initial matching beam pair.

Figure 30:
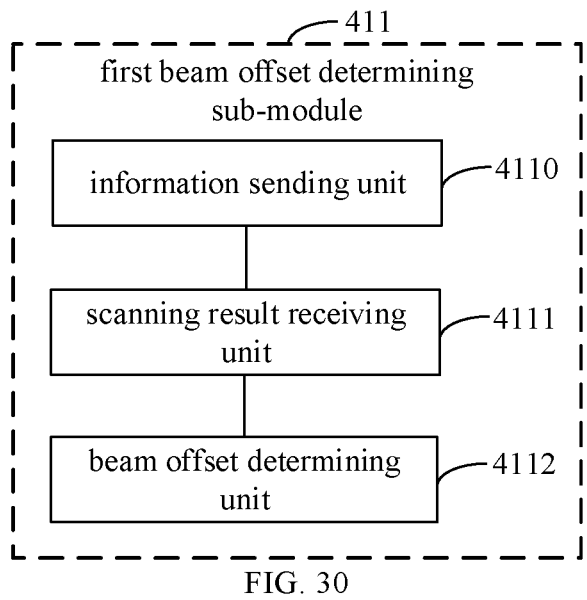
FIG. 30 is a block diagram illustrating another apparatus for transmitting information according to an embodiment of the disclosure.

FIG. 30 is a block diagram illustrating another apparatus for transmitting information according to an embodiment. Based on the apparatus embodiment shown in FIG. 29, the first beam offset determining sub-module 411 may further include: an information sending unit 4110, configured to send the preset scanning configuration information to the user equipment, in which the preset scanning configuration information is configured to instruct the user equipment to perform the additional beam scanning.

In an apparatus embodiment of the disclosure, the information sending unit 4110 may be configured to send the preset scanning configuration information to the user equipment under any one of the following conditions: the base station detects that information transmission performance in the current operating mode is lower than a preset transmission performance threshold; and there are preset service requirements.

Figure 31:
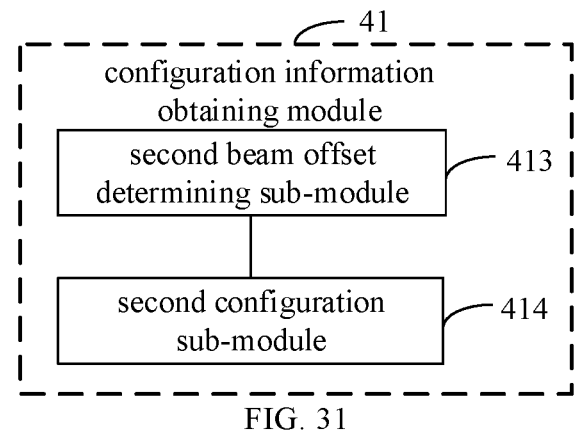
FIG. 31 is a block diagram illustrating another apparatus for transmitting information according to an embodiment of the disclosure.

FIG. 31 is a block diagram illustrating another apparatus for transmitting information according to an embodiment. Based on the apparatus embodiment shown in FIG. 27, the configuration information obtaining module 41 may include: a second beam offset determining sub-module 413 and a second configuration sub-module 414.

The second beam offset determining sub-module 413 is configured to predict the target beam offset information by a preset model for beam offset prediction.

The second configuration sub-module 414 is configured to determine the beam offset configuration information according to the target beam offset information.

Figure 32:
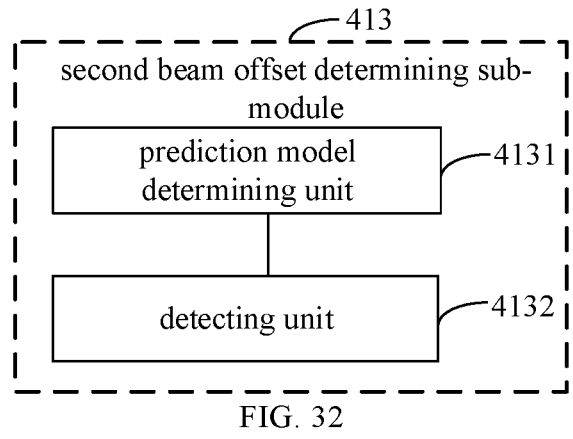
FIG. 32 is a block diagram illustrating another apparatus for transmitting information according to an embodiment of the disclosure.

FIG. 32 is a block diagram illustrating another apparatus for transmitting information according to an embodiment. Based on the apparatus embodiment shown in FIG. 31, the second beam offset determining sub-module 413 may include: a prediction model determining unit 4131 and a detecting unit 4132.

The prediction model determining unit 4131 is configured to determine the preset model for beam offset prediction based on a preset number of beam offset history records.

The detecting unit 4132 is configured to input information of the preset operating mode change into the preset model for beam offset prediction, and obtain the target beam offset information suitable for the preset operating mode change.

Figure 33:
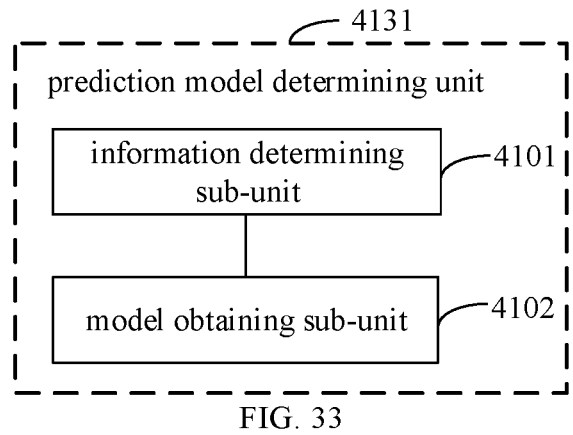
FIG. 33 is a block diagram illustrating an apparatus for transmitting information according to an embodiment of the disclosure.

FIG. 33 is a block diagram illustrating another apparatus for transmitting information according to an embodiment. Based on the apparatus embodiment shown in FIG. 32, the prediction model determining unit 4131 may include: an information determining sub-unit 4101 and a model obtaining sub-unit 4102.

The information determining sub-unit 4101 is configured to determine information of the information transmission end in a current application scenario. The information of the information transmission end includes information of a base station and a type of a user equipment.

The model obtaining sub-unit 4102 is configured to determine a model for beam offset prediction corresponding to the information of the information transmission end at a preset storage location as the preset model for beam offset prediction.

Figure 34:
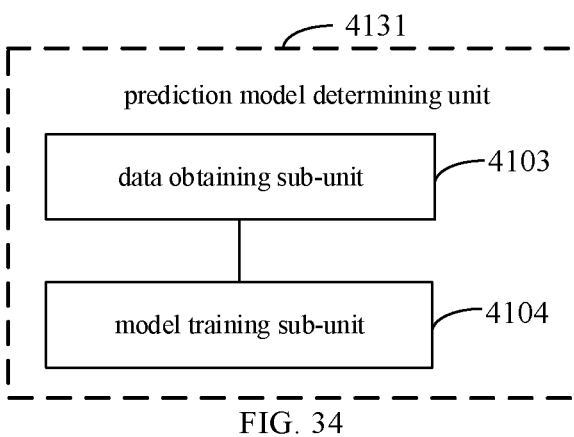
FIG. 34 is a block diagram illustrating another apparatus for transmitting information according to an embodiment of the disclosure.

FIG. 34 is a block diagram illustrating another apparatus for transmitting information according to an embodiment. Based on the apparatus embodiment shown in FIG. 32, the prediction model determining unit 4131 may include: a data obtaining sub-unit 4103 and a model training sub-unit 4104.

The data obtaining sub-unit 4103 is configured to obtain an amount of beam offset history record data that is not less than a preset amount threshold. Each piece of beam offset history record data includes operating mode change information and beam offset information.

The model training sub-unit 4104 is configured to obtain the preset model for beam offset prediction with the beam offset history record data as sample data for model training.

Figure 35:
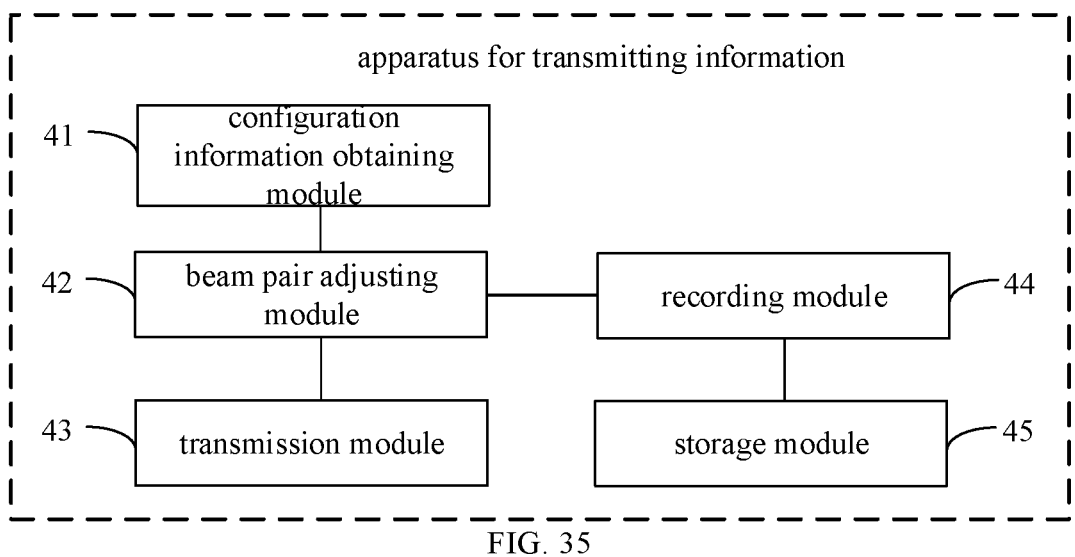
FIG. 35 is a block diagram illustrating another apparatus for transmitting information according to an embodiment of the disclosure.

FIG. 35 is a block diagram illustrating another apparatus for transmitting information according to an embodiment. Based on the apparatus embodiment shown in FIG. 27, the apparatus may further include: a recording module 44 and a storage module 45.

The recording module 44 is configured to generate a beam offset record by obtaining the target beam offset information corresponding to the preset operating mode change.

The storage module 45 is configured to locally store the beam offset record.

In another embodiment of the disclosure, the storage module 45 may also be configured to send the beam offset record to a cloud server or a user equipment for storage.

Figure 36:
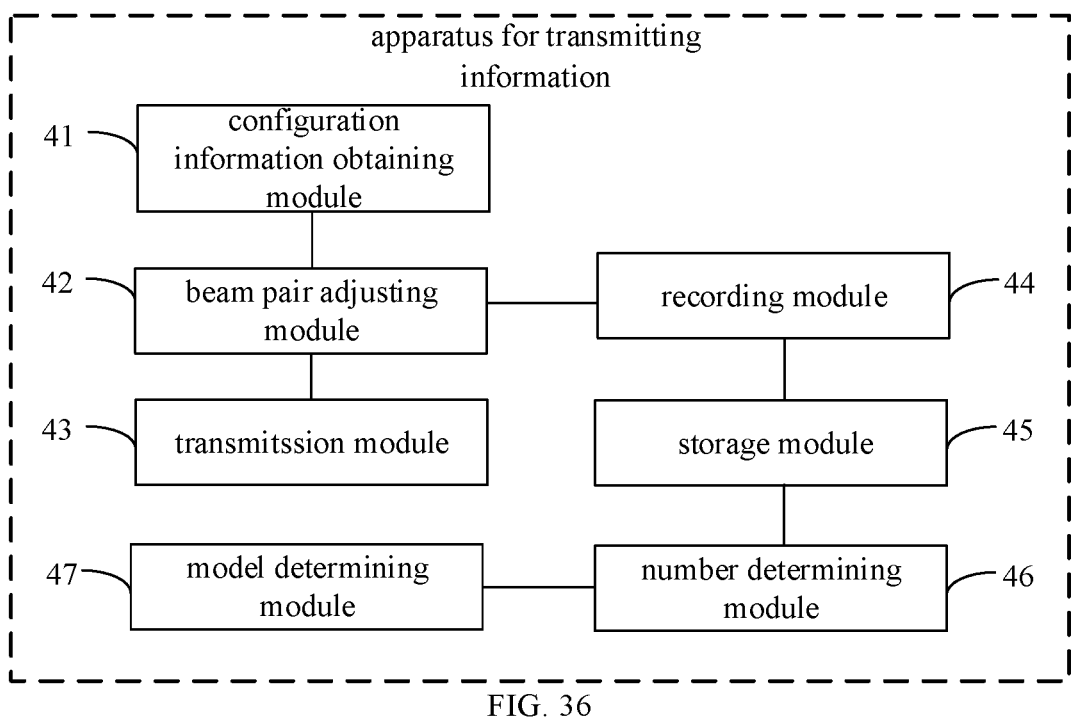
FIG. 36 is a block diagram illustrating another apparatus for transmitting information according to an embodiment of the disclosure.

FIG. 36 is a block diagram illustrating another apparatus for transmitting information according to an embodiment. Based on the apparatus embodiment shown in FIG. 35, the apparatus may further include: a number determining module 46 and a model determining module 47.

The number determining module 46 is configured to determine a number of beam offset history records stored in local or in the cloud server.

The model determining module 47 is configured to, when the number of the beam offset history records exceeds a preset threshold, determine a model for beam offset prediction corresponding to a type of the user equipment with the beam offset history records.

Since the apparatus embodiments basically corresponds to the method embodiments, related parts refer to the corresponding description parts in the method embodiments. The apparatus embodiments described above are merely exemplary. The units described above as separate components may or may not be physically separated, and the components displayed as units may or may not be physical units, that is, the components may be located in one place, or distributed to multiple network units. Some or all of the modules are selected according to actual needs to achieve the objectives of the solution of the disclosure, which may be understood and implemented by those of ordinary skill in the art without inventive works.

Correspondingly, a user equipment is provided in one aspect, which includes: a processor and a memory for storing instructions executable by the processor.

The processor is configured to: obtain beam offset configuration information; adjust the initial matching beam pair according to the beam offset configuration information in response to detecting that the UE is switched from the first preset operating mode to the second preset operating mode, so as to obtain the target matching beam pair; and transmit information in the second preset operating mode according to the target matching beam pair. The beam offset configuration information is used to instruct an information transmission end to adjust an initial matching beam pair in a first preset operating mode when there is a preset operating mode change, so as to determine a target matching beam pair in a second preset operating mode. The preset operating mode change indicates that the information transmission end is switched from the first preset operating mode to the second preset operating mode.

In another aspect, a base station is provided. The base station includes: a processor and a memory for storing instructions executable by the processor.

The processor is configured to: obtain beam offset configuration information; adjust the initial matching beam pair according to the beam offset configuration information in response to detecting that the base station is switched from the first preset operating mode to the second preset operating mode, so as to obtain a target matching beam pair; and transmit information in the second preset operating mode according to the target matching beam pair. The beam offset configuration information is used to instruct an information transmission end to adjust an initial matching beam pair in a first preset operating mode when there is a preset operating mode change, so as to determine the target matching beam pair in a second preset operating mode. The preset operating mode change indicates that the information transmission end is switched from the first preset operating mode to the second preset operating mode.

Figure 37:
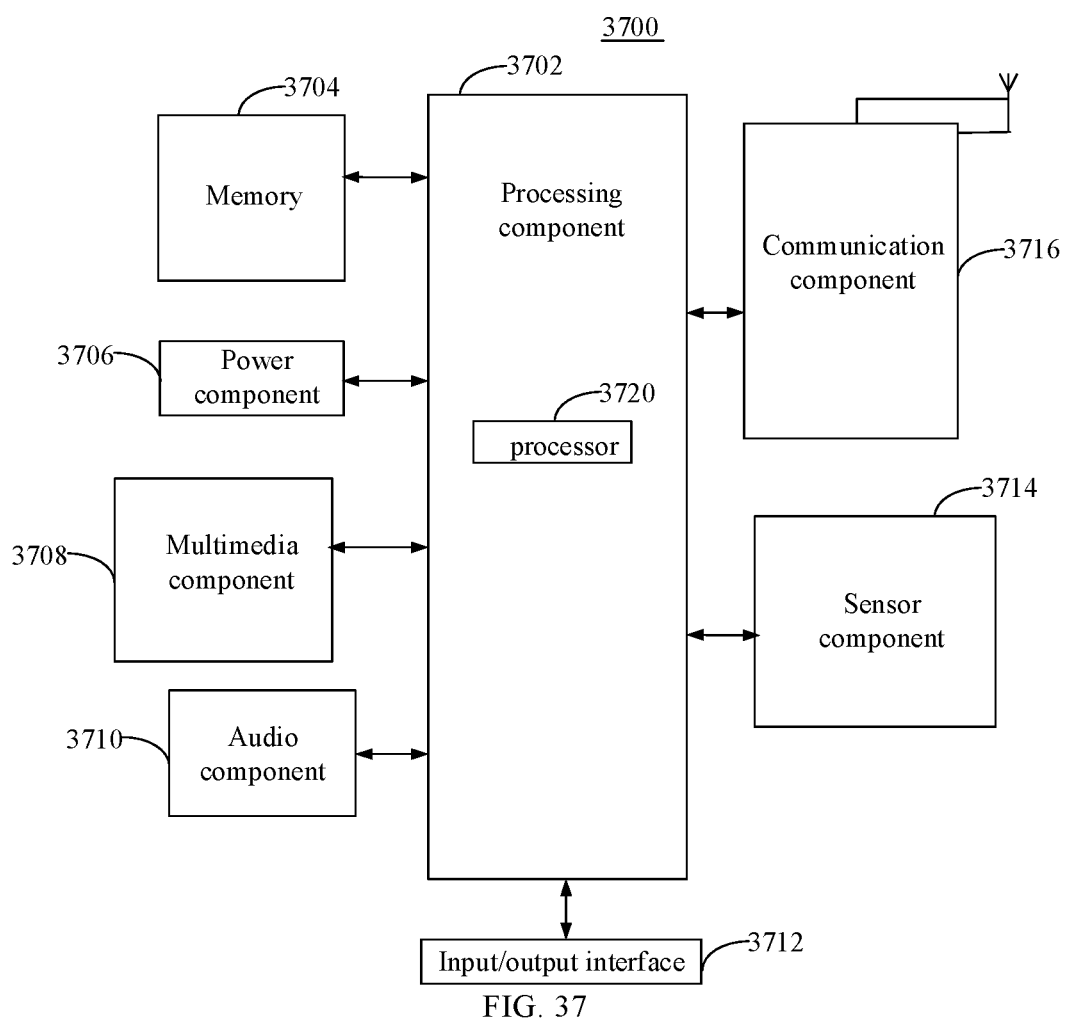
FIG. 37 is a schematic diagram illustrating a user equipment according to an embodiment of the disclosure.

FIG. 37 is a block diagram illustrating a user equipment 3700 according to an embodiment of the disclosure. For example, the user equipment 3700 may be a mobile phone, a computer, a digital broadcasting terminal, a message transceiver device, a game console, a tablet device, a medical device, a fitness device, a personal digital assistant, and a wearable device such as smart watches, smart glasses, smart bracelets, and smart running shoes.

As illustrated in FIG. 37, the user equipment 3700 may include one or more of the following components: a processing component 3702, a memory 3704, a power component 3706, a multimedia component 3708, an audio component 3710, an input/output (I/O) interface 3712, a sensor component 3714, and a communication component 3716.

The processing component 3702 typically controls overall operations of the user equipment 3700, such as the operations associated with display, telephone calls, data communications, camera operations, and recording operations. The processing component 3702 may include one or more processors 3720 to execute instructions to perform all or part of the steps in the above described method. Moreover, the processing component 3702 may include one or more modules which facilitate the interaction between the processing component 3702 and other components. For instance, the processing component 3702 may include a multimedia module to facilitate the interaction between the multimedia component 3708 and the processing component 3702.

The memory 3704 is configured to store various types of data to support the operation of the user equipment 3700. Examples of such data include instructions for any applications or methods operated on the user equipment 3700, contact data, phonebook data, messages, pictures, video, etc. The memory 3704 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 3706 provides power to various components of the user equipment 3700. The power component 3706 may include a power management system, one or more power sources, and any other components associated with the generation, management, and distribution of power in the user equipment 3700.

The multimedia component 3708 includes a screen providing an output interface between the user equipment 3700 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 3708 includes a front-facing camera and/or a rear-facing camera. When the user equipment 3700 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 3710 is configured to output and/or input audio signals. For example, the audio component 3710 includes a microphone (MIC) configured to receive an external audio signal when the user equipment 3700 is in an operation mode, such as a call mode, a recording mode, and a voice recognition mode. The received audio signal may be further stored in the memory 3704 or transmitted via the communication component 3716. In some embodiments, the audio component 3710 further includes a speaker to output audio signals.

The I/O interface 3712 provides an interface between the processing component 3702 and peripheral interface modules, such as a keyboard, a click wheel, buttons, and the like. The buttons may include, but are not limited to, a home button, a volume button, a starting button, and a locking button.

The sensor component 3714 includes one or more sensors to provide status assessments of various aspects of the user equipment 3700. For instance, the sensor component 3714 may detect an open/closed status of the user equipment 3700, relative positioning of components, e.g., the display and the keypad, of the user equipment 3700, a change in position of the user equipment 3700 or a component of the user equipment 3700, a presence or absence of user contact with the user equipment 3700, an orientation or an acceleration/deceleration of the user equipment 3700, and a change in temperature of the user equipment 3700. The sensor component 3714 may include a proximity sensor configured to detect the presence of nearby objects without any physical contact. The sensor component 3714 may also include a light sensor, such as a CMOS or CCD image sensor, for use in imaging applications. In some embodiments, the sensor component 3714 may also include an accelerometer sensor, a gyroscope sensor, a magnetic sensor, a pressure sensor, or a temperature sensor.

The communication component 3716 is configured to facilitate communication, wired or wirelessly, between the user equipment 3700 and other devices. The user equipment 3700 can access a wireless network based on a communication standard, such as WiFi, 2G, or 3G, or a combination thereof. In an embodiment, the communication component 3716 receives a broadcast signal or broadcast associated information from an external broadcast management system via a broadcast channel. In an embodiment, the communication component 3716 further includes a near field communication (NFC) module to facilitate short-range communications. For example, the NFC module may be implemented based on a radio frequency identity (RFID) technology, an infrared data association (IrDA) technology, an ultra-wideband (UWB) technology, a Bluetooth (BT) technology, and other technologies.

In some embodiments, the user equipment 3700 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described method.

In some embodiments, there is also provided a non-transitory computer readable storage medium including instructions, such as included in the memory 3704, executable by the processor 3720 in the user equipment 3700, for performing the above method. For example, the non-transitory computer-readable storage medium may be a ROM, a RAM, a CD-ROM, a magnetic tape, a floppy disc, an optical data storage device, and the like.

Figure 38:
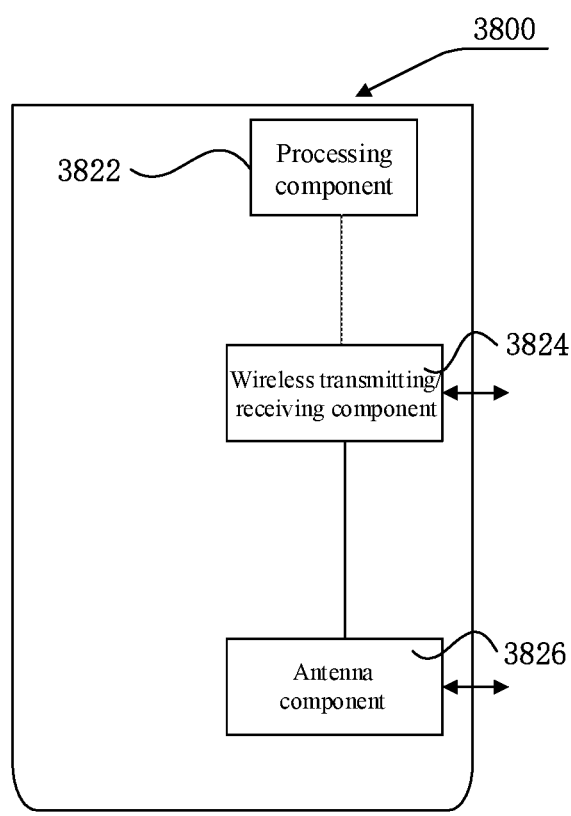
FIG. 38 is a schematic diagram illustrating a base station according to an embodiment of the disclosure.

As illustrated in FIG. 38, FIG. 38 is a schematic diagram illustrating a base station 3800 according to an embodiment. As illustrated in FIG. 38, the base station 3800 includes a processing component 3822, a wireless transmitting/receiving component 3824, an antenna component 3826, and a signal processing part specific to a wireless interface. The processing component 3822 may further include one or more processors.

One of the processors in the processing component 3822 may be configured to: obtain beam offset configuration information; adjust the initial matching beam pair according to the beam offset configuration information in response to detecting that the base station is switched from the first preset operating mode to the second preset operating mode, so as to obtain a target matching beam pair; and transmit information in the second preset operating mode according to the target matching beam pair. The beam offset configuration information is used to instruct an information transmission end to adjust an initial matching beam pair in a first preset operating mode when there is a preset operating mode change, so as to determine a target matching beam pair in a second preset operating mode. The preset operating mode change indicates that the information transmission end is switched from the first preset operating mode to the second preset operating mode.

In an embodiment, a non-transitory computer-readable storage medium is also provided, where computer instructions have been stored thereon. The computer instructions are executed by the processing component 3822 of the base station 3800 to complete the method for transmitting information according to any one of FIG. 11 to FIG. 16. For example, the non-transitory computer-readable storage medium may be a ROM, a RAM, a CD-ROM, a magnetic tape, a floppy disk, and an optical data storage device.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

In the embodiments of the disclosure, the information transmission end may pre-determine beam offset configuration information suitable to the changed preset operating mode before the preset operating mode changes. When the above preset operating mode have changed, that is, the first preset operating mode is switched to the second preset operating mode for the base station and the UE, the information transmission end may directly adjust the initial matching beam pair in the first preset operating mode according to the predetermined beam offset configuration information, to obtain the optimal matching beam pair in the second preset operating mode. Since the beam scanning is not required in the adjustment process of the above beam pair, the efficiency of adjusting the beam pair may be effectively improved, thereby adapting to application scenarios where the beam pair needs to change frequently (such as improving a capacity of the information transmission end adaptive to an application scene with a high-speed movement), ensuring information transmission performance of the UE and the base station in the above application scenarios, saving signaling overheads required for the UE performing real-time beam scanning, and saving power consumption of the UE and the base station.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for transmitting information, comprising:
determining beam Offset configuration information for instructing an information transmission end to adjust an initial matching beam pair in a first preset operating mode when there is a preset operating mode change, so as to determine a target matching beam pair in a second preset operating mode, wherein the preset operating mode change indicates that the information transmission end is switched from the first preset operating mode to the second preset operating mode, wherein the beam offset configuration information comprises target beam offset information for indicating a beam offset direction and a beam offset amount, wherein the first preset operating mode is a mode where a user equipment (UE) moves at a first speed relative to a base station, and the second preset operating mode is a mode where the UE moves at a second speed relative to the base station, wherein the second speed is greater than the first speed;

adjusting the initial matching beam pair according to the beam offset configuration information, in response to detecting that the information transmission end is switched from the first preset operating mode to the second preset operating mode when the information transmission end is the UE or detecting that a local end communicating with the information transmission end is switched from the first preset operating mode to the second preset operating mode when the local end is the UE and the information transmission end is the base station, so as to obtain the target matching beam pair; and performing data communication in the second preset operating mode according to the target matching beam pair;

wherein determining the beam offset configuration information comprises:

determining the target beam offset information by performing additional beam scanning; and determining the beam offset configuration information according to the target beam offset information;

wherein the method is applied to the UE, and determining the target beam offset information comprises:

obtaining scanning configuration information for instructing the UE to perform the additional beam scanning according to preset time indication information;

obtaining an additional scanning result by performing the additional beam scanning based on the scanning configuration information; and determining the target beam offset information by processing the additional scanning result;

wherein obtaining the scanning configuration information comprises:

receiving the scanning configuration information sent by the base station in real time; or determining the scanning configuration information according to preset system convention information;

wherein receiving the scanning configuration information comprises:

receiving the scanning configuration information under a first preset trigger condition, wherein the first preset trigger condition comprises at least one of the following actions: the base station detects that information transmission performance in a current operating mode is lower than a preset threshold; or the base station currently accessed by the UE has preset service requirements;

wherein determining the target beam offset information by processing the additional scanning result comprises:

determining the target beam offset information by sending the additional scanning result to the base station, and enabling the base station to compare the additional scanning result with the initial matching beam pair.

2. The method of claim 1, wherein determining the beam offset configuration information comprises:

predicting the target beam offset information by a preset model; and determining the beam offset configuration information according to the target beam offset information.

3. The method of claim 1, wherein receiving the scanning configuration information comprises:

sending an additional scanning configuration request to the base station in response to detecting the UE configured to be in the second preset operating mode or instructed by current preset parameter information to enter the second preset operating mode; and receiving the scanning configuration information sent by the base station responding to the additional scanning configuration request.

4. The method of claim 1, wherein the scanning configuration information comprises :

a time window and a period duration for the additional scanning, and obtaining the additional scanning result comprises:

obtaining the additional scanning result by performing periodic beam scanning according to the period duration within the time window.

5. The method of claim 1, wherein the scanning configuration information comprises at least one piece of time information for triggering the additional scanning; and obtaining the additional scanning result comprises:

obtaining the additional scanning result by performing the additional beam scanning according to each piece of time information.

6. The method of claim 1, wherein determining the target beam offset information comprises:

determining the target beam offset information by comparing the additional scanning result with the initial matching beam pair.

7. The method of claim 2, wherein predicting the target beam offset information comprises:

determining the preset model based on a preset number of beam offset history records; and inputting information of the preset operating mode change into the preset model, and obtaining the target beam offset information suitable for the preset operating mode change.

8. The method of claim 7, wherein determining the preset model comprises:

determining information of the information transmission end, wherein the information of the information transmission end comprises information of the base station and a type of the user equipment; and obtaining a model for beam offset prediction corresponding to the information of the information transmission end from the base station or a cloud server as the preset model.

9. The method of claim 7, wherein determining the preset model comprises:

obtaining an amount of beam offset history record data that is not less than a preset amount threshold, wherein each piece of beam offset history record data includes operating mode change information and beam offset information; and obtaining the preset model with the beam offset history record data as sample data for model training.

10. The method of claim 1, wherein the method is applied to the base station, and determining the target beam offset information comprises:

sending preset scanning configuration information to a user equipment (UE), in which the preset scanning configuration information instructs the UE to perform the additional beam scanning and obtain an optimal matching beam pair;

receiving the optimal matching beam pair sent by the UE; and determining the target beam offset information by comparing the optimal matching beam pair with the initial matching beam pair.

11. The method of claim 10, wherein the base station sends the preset scanning configuration information to the UE when any one of the following is satisfied: the base station detects that information transmission performance in a current operating mode is lower than a preset threshold; and the base station has preset service requirements.

12. The method of claim 1, further comprising:
generating a beam offset record by obtaining the target beam offset information corresponding to the preset operating mode change; and
storing the beam offset record in local or in a cloud server.

13. The method of claim 12, further comprising:
determining a number of beam offset history records stored in local or in the cloud server; and
in response to the number of the beam offset history records exceeding a preset threshold, determining a model for beam offset prediction corresponding to a type of a user equipment with the beam offset history records.

14. A user equipment (UE), comprising:
a processor;
a memory for storing instructions executable by the processor;
wherein the processor is configured to:
determine beam offset configuration information for instructing an information transmission end to adjust an initial matching beam pair in a first preset operating mode when there is a preset operating mode change, so as to determine a target matching beam pair in a second preset operating mode, wherein the preset operating mode change indicates that the information transmission end is switched from the first preset operating mode to the second preset operating mode, wherein the beam offset configuration information comprises target beam offset information for indicating a beam offset direction and a beam offset amount, wherein the first preset operating mode is a mode where the UE moves at a first speed relative to a base station, and the second preset operating mode is a mode where the UE moves at a second speed relative to the base station, wherein the second speed is greater than the first speed;
adjust the initial matching beam pair according to the beam offset configuration information in response to detecting that the UE is switched from the first preset operating mode to the second preset operating mode, so as to obtain the target matching beam pair; and
perform data communication in the second preset operating mode according to the target matching beam pair;
wherein the processor is configured to determine the beam offset configuration information by:
determining the target beam offset information by performing additional beam scanning; and
determining the beam offset configuration information according to the target beam offset information;
where determining the target beam offset information comprises:
obtaining scanning configuration information for instructing the UE to perform the additional beam scanning according to preset time indication information;
obtaining an additional scanning result by performing the additional beam scanning based on the scanning configuration information; and
determining the target beam offset information by processing the additional scanning result;
wherein obtaining the scanning configuration information comprises:
receiving the scanning configuration information sent by the base station in real time; or determining the scanning configuration information according to preset system convention information;
wherein receiving the scanning configuration information comprises:
receiving the scanning configuration information under a first preset trigger condition, wherein the first preset trigger condition comprises at least one of the following actions: the base station detects that information transmission performance in a current operating mode is lower than a preset threshold; or the base station currently accessed by the UE has preset service requirements;
wherein determining the target beam offset information by processing the additional scanning result comprises:
determining the target beam offset information by sending the additional scanning result to the base station, and enabling the base station to compare the additional scanning result with the initial matching beam pair.

15. A base station, comprising:
a processor;
a memory for storing instructions executable by the processor; wherein the processor is configured to:
determine beam offset configuration information for instructing an information transmission end to adjust an initial matching beam pair in a first preset operating mode when there is a preset operating mode change, so as to determine a target matching beam pair in a second preset operating mode, wherein the preset operating mode change indicates that the information transmission end is switched from the first preset operating mode to the second preset operating mode, wherein the beam offset configuration information comprises target beam offset information for indicating a beam offset direction and a beam offset amount, wherein the first preset operating mode is a mode where a user equipment (UE) moves at a first speed relative to the base station, and the second preset operating mode is a mode where the UE moves at a second speed relative to the base station, wherein the second speed is greater than the first speed;
adjust the initial matching beam pair according to the beam offset configuration information in response to detecting that the UE communicating with the base station is switched from the first preset operating mode to the second preset operating mode, so as to obtain the target matching beam pair; and
perform data communication in the second preset operating mode according to the target matching beam pair;
wherein the processor is configured to determine the beam offset configuration information by:
determining the target beam offset information by performing additional beam scanning; and
determining the beam offset configuration information according to the target beam offset information;
where determining the target beam offset information comprises:
sending preset scanning configuration information to the user equipment (UE), in which the preset scanning configuration information instructs the UE to perform the additional beam scanning and obtain an optimal matching beam pair;
receiving the optimal matching beam pair sent by the UE; and
determining the target beam offset information by comparing the optimal matching beam pair with the initial matching beam pair;

wherein the base station sends the preset scanning configuration information to the UE when any one of the following is satisfied: the base station detects that information transmission performance in a current operating mode is lower than a preset threshold; and the base station has preset service requirements.

* * * * *